US010209711B1

(12) United States Patent
Brazeau

(10) Patent No.: US 10,209,711 B1
(45) Date of Patent: Feb. 19, 2019

(54) TECHNIQUES FOR CONTENTION RESOLUTION FOR MOBILE DRIVE UNITS

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

(*) Notice: Subject to any disclaimer, the term of this patent is extended or adjusted under 35 U.S.C. 154(b) by 199 days.

(21) Appl. No.: 15/279,264

(22) Filed: Sep. 28, 2016

(51) Int. Cl.
*G05D 1/08* (2006.01)
*G05D 1/00* (2006.01)
*G05D 1/02* (2006.01)
*G01C 21/20* (2006.01)
*G06N 99/00* (2010.01)
*B65G 1/04* (2006.01)
*B65G 1/10* (2006.01)
*B65G 1/137* (2006.01)

(52) U.S. Cl.
CPC ......... *G05D 1/0088* (2013.01); *B65G 1/0492* (2013.01); *B65G 1/10* (2013.01); *B65G 1/1373* (2013.01); *G01C 21/206* (2013.01); *G05D 1/0221* (2013.01); *G06N 99/005* (2013.01)

(58) Field of Classification Search
None
See application file for complete search history.

(56) References Cited

U.S. PATENT DOCUMENTS

| 8,280,547 | B2 | 10/2012 | D'Andrea et al. | |
| 9,087,314 | B2* | 7/2015 | Hoffman | G06Q 10/087 |
| 2014/0358828 | A1* | 12/2014 | Phillipps | G06N 99/005 706/12 |

* cited by examiner

*Primary Examiner* — Mussa A Shaawat
*Assistant Examiner* — Michael V Kerrigan
(74) *Attorney, Agent, or Firm* — Kilpatrick Townsend & Stockton LLP

(57) ABSTRACT

Systems and methods are provided herein for providing contention resolutions for components (e.g., mobile drive units, personnel devices) of an inventory system. For example, a method may comprise determining a task to be performed by a mobile drive unit within a storage facility. The MDU may be provided a set of commands related to the task. Conflict information may be received from the MDU that indicates an obstacle related to the set of commands and the task. An alternate set of commands may be generated for the MDU based at least in part on the conflict information and a computer-generated model. In at least one embodiment, the computer-generated model may be trained based at least in part on historical conflict information and conflict resolution information specific to tasks performed within the storage facility. The alternate set of commands related to the task may be provided to the MDU.

19 Claims, 11 Drawing Sheets

TECHNIQUES FOR CONTENTION RESOLUTION FOR MOBILE DRIVE UNITS

BACKGROUND

Modern inventory systems, such as those in storage facilities (e.g., a warehouse) operated by electronic marketplace providers, face significant challenges with respect to managing items in inventory. While storing items within a storage facility and retrieving items for order fulfillment were once traditionally accomplished by human personnel, it is becoming more common for these functions to be performed by a myriad of robotic devices (e.g., mobile drive units (MDUs)). As these devices travel about the storage facility, unexpected obstacles may be encountered such as fallen objects, misplaced storage containers, other MDUs, a human being, liquid on the ground, or the like. Current systems may lack effective contention resolution methods for overcoming these obstacles.

For example, it may be the case that two MDUs need to cross the same space at substantially the same time in the course of performing their respective tasks. This may cause the MDUs to compete for the space. In some systems, each mobile drive unit (MDU) may wait some period of time before requesting access to the space again. This may lead to performance inefficiencies as the MDUs may be stationary while they each wait to ascertain if the space is available. As another example, an MDU may encounter a stationary obstacle (such as a package that has fallen on the warehouse floor) and/or moveable/moving obstacle (such as another MDU, a human, etc.). In this scenario, the area around the obstacle may be labelled as inaccessible and the MDU (and potentially other MDUs) may be redirected to avoid the area. Computing new paths to avoid these areas may lead to delay and even further contentions as the travelable area within the warehouse has decreased. Additionally, current techniques may not allow the system to recover these areas even if the obstacle (e.g., the package, the human, etc.) no longer presents a conflict. Accordingly, current techniques may lead to delays in task completion that may negatively affect the performance of the MDUs operating in the storage facility individually, or as a whole, which may in turn lead to decreased profits for the electronic marketplace provider and a loss of good will with respect to its customers. Embodiments of the invention address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
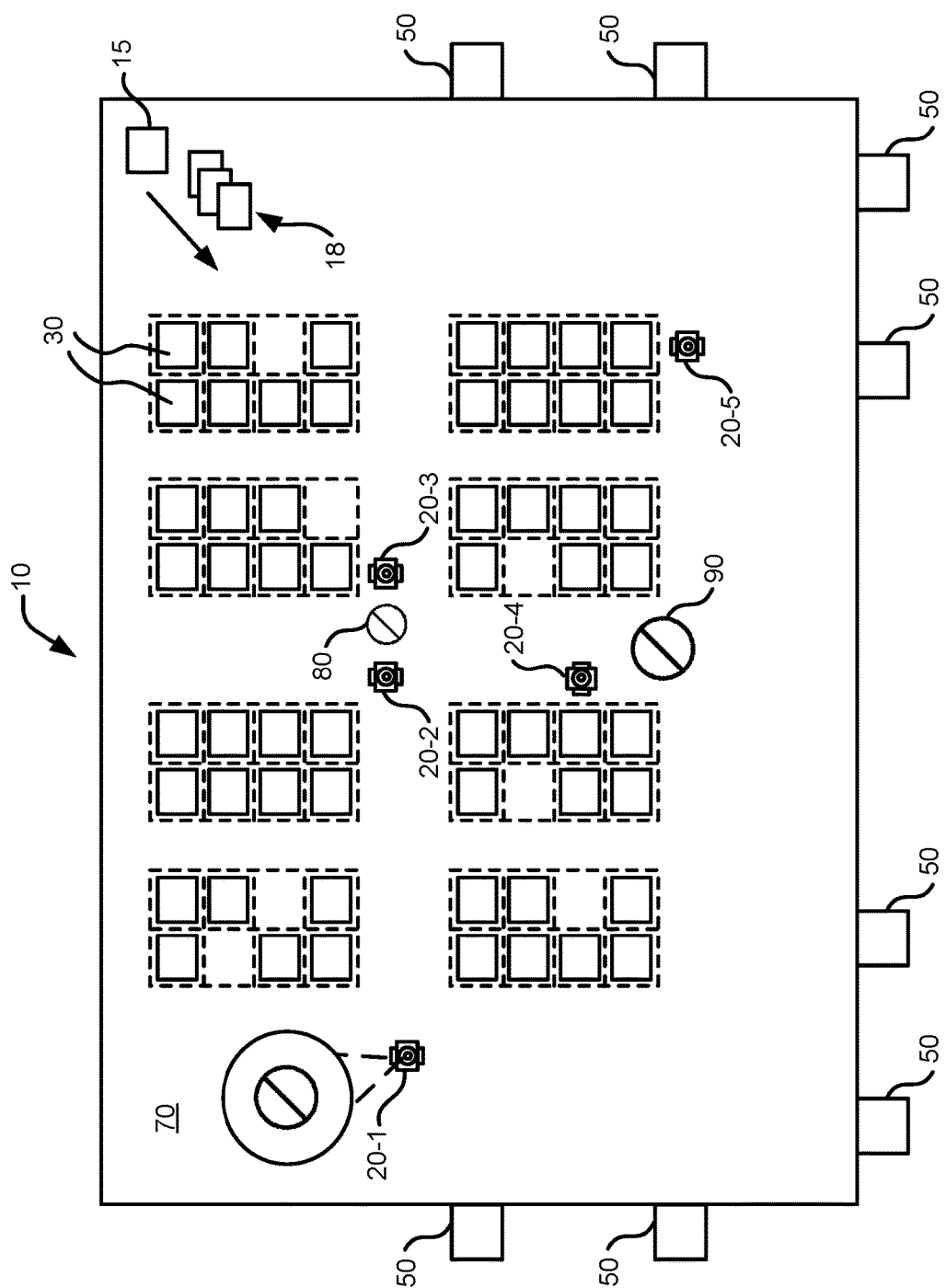
FIG. 1 is a schematic diagram illustrating an example environment suitable for implementing aspects of an inventory system, in accordance with at least one embodiment.

Techniques described herein are directed to systems and methods for resolving contentions (e.g., obstacles) encountered by one or more components (e.g., MDUs, electronic devices associated with a human, etc.) of a storage facility utilizing machine learning techniques. Although examples throughout may utilize warehouses and/or warehouse machinery for illustrative purposes, it should be appreciated that any example herein may be equally applied to other suitable contexts. As used herein, a "contention" is intended to refer situations in which a particular MDU may not utilize a specific area in a storage facility due to one or more obstacles. "Obstacles," may include fallen objects, misplaced objects/storage containers, one or more other MDUs, one or more human beings on the warehouse floor, liquid on the ground, or the like. It should be appreciated that any functionality described with respect to a "centralized management module," a "distributed management module," or a "management module" may be performed in a centralized server computer or as distributed components operating on one or more MDUs. Throughout the description below, examples that utilize one or more MDUs may equally apply to situations that include any suitable combination of one or more MDUs and/or one or more personnel devices associated with a human being (e.g., an electronic device worn, carried, operated by, or otherwise generally associated with a human being within the storage facility). Any functionality described with respect to the management module described herein may be provided to and/or by both an MDU or a personnel device. Thus, it is envisioned that the management module discussed herein may provide contention resolution involving any suitable combination of one or more MDUs and/or one or more human beings within a storage facility.

In at least one embodiment, a management module of an inventory system may be responsible for determining tasks and assigning individual tasks to individual MDUs/humans in a storage facility operated by, or on behalf of an electronic marketplace provider (e.g., an online retailer of physical items). For example, the management module may determine that an item (e.g., a single item, a pallet, a cart, or any suitable container that stores one or more items) is to be moved from a first location (e.g., a receiving dock) to a second location (e.g., a designated storage location within the storage facility). The management module may determine a storage location for the item based on any suitable inventory management techniques.

In at least one embodiment, the management module may determine a particular MDU of a set of MDUs operating in the storage facility. In some examples, the management module may determine a particular human/humans from a set of humans within the storage facility. The particular MDU/human may be selected, for example, based on the first location, the second location, a location of the particular MDU/human, or any suitable combination of the above. For example, an MDU that is closest to the first location may be selected. The management module (or individual components/agents of the management module associated with individual MDUs) may generate a set of commands that instruct the MDU and/or human (e.g., via a personnel device) to perform a task (e.g., retrieve the item from the first location and deliver it to the second location). In some embodiments, the management module (or a component of the management module) may generate and incrementally provide the set of commands to the tasked MDU and/or the personnel device of the human assigned to the task. In a non-liming example, the management module may instruct the MDU to proceed a distance (e.g., 3 feet) in a given direction (e.g., north, in a particular heading, etc.) or to proceed to a given location (e.g., an x/y coordinate corresponding to 3 feet north of the MDU's current location). In some examples, the management module may wait to provide another command until it receives an indication from the MDU that it has successfully completed the previous command. Similarly the management module may incrementally instruct the human (via the personnel device) to proceed in an incremental fashion to perform the task at hand and may wait to provide another command until it receives an indication from the personnel device that the human has successfully completed the previous command.

In at least one embodiment, historical contention information (e.g., obstacle information including sensor data generated by one or more sensors of the MDU, obstacle information provided from one or more components of the warehouse such stationary/moving obstacle sensing devices, etc.) and contention resolution information related to the storage facility may be gathered over time. "Obstacle information" may include, but is not limited to, identifiers of the one or more MDUs involved in a contention, identifiers of one or more personnel devices of a human being that is involved in the contention, a task and/or a priority associated with the task assigned to the one or more MDUs and/or one or more human beings, sensor data related to an obstacle, a location of the obstacle, a location of the MDU (and/or a personnel device) providing the information, one or more locations associated with other MDUs/other humans within a threshold distance of the location of the obstacle and/or the MDU/personnel device, a number of alternate paths available to the MDU/human, or the like. "Contention resolution information" may include, but is not limited to, a set of commands corresponding to paths traversed by an MDU/personnel device after encountering the obstacle, an expected task completion time, an actual task completion time, a time delay value quantifying a difference between an expected task completion time and an actual task completion time, or the like. In at least one example, during the course of providing commands to various MDUs/personnel devices to perform various tasks (e.g., storing items, moving items, reporting to a docking station, clearing an obstacle, etc.) historical data including historical contention information and contention resolution information may be collected. The management module may be utilized to analyze the historical data to determine various contentions/obstacles that were encountered by one or more MDUs and/or personnel devices and the corresponding actions that were taken with respect to the affected MDUs and/or personnel devices.

The management module may generate a statistical model utilizing at least one machine learning technique (e.g., a regression algorithm, a genetic algorithm, a random forest algorithm, or the like) and the historical data. For example, historical contention information may be utilized as input to generate the model and the contentions resolution information may be scored and used to train the model. The management module may utilize a machine learning algorithm to generate and train the model using the historical contention information and the contention resolution information in order to identify a best course of action to perform when attempting to resolve a contention corresponding to a given a set of inputs (e.g., obstacle information). In at least one embodiment, a "best course of action" may include one or more actions to be performed by an MDU and/or a human that will result in the least amount of time delay for task completion of one or more MDUs (or all the MDUs, and/or one or more humans, and/or all of the humans) in the inventory system. In at least one embodiment, the management module may utilize the model to generate and store protocol sets corresponding to a set of actions to take given particular inputs. In at least one embodiment, the management module may receive/retrieve the model and/or protocol sets from a remote source.

In at least one example, a priority associated with a task to be performed by an MDU (or human) affected by a contention/obstacle may be an additional or alternative factor in determining the best course of action. For example, the best course of action may be determining one or more actions that result in a least amount of time delay across the MDUs/humans of the inventory system after weighing a particular MDU's/human's delay in task completion time more heavily than another. In other words, if a first MDU/human is performing a higher priority task (e.g., moving an item in the storage facility) and second MDU/human is performing a lower priority task (e.g., going to a charging station, travelling to a location other than an inventory station, etc.), the best course of action may be one that results in the least combined time delay, where the task completion delay for the higher priority task is weighed more heavily than the task completion delay for the lower priority task. In a further example, the best course of action may be determined to be one or more actions that provide the least task completion delay for a higher priority task regardless of the effects the one or more actions may have with respect to one or more lower priority tasks. In at least one example, for safety concerns, a human being/personnel device may be associated with a higher priority than any given task performed by an MDU. While in other examples, the tasks assigned to the human being/personnel device may have varying levels of priority.

As a non-limiting example, as tasks are being performed by the MDUs of the inventory system, the management module may determine that a contention exists between one or more MDUs. For example, the management module may determine that a first MDU should head in a given direction for a given distance in order to continue executing its assigned task. However, the management module may further determine that a second MDU's heading will cause the MDUs to crash into one another. Accordingly, the management module may collect and/or receive obstacle information from one, or both, MDUs involved in the contention. The management module may utilize such data as input into the previously-trained model in order to identify a best course of action. As a non-limiting example, the model may identify, given the information associated with the obstacle, that the first MDU should proceed to move a given distance in a given direction while the second MDU should remain stationary. As another example, the model may identify that the best course of action is for one MDU to move to the left while the other MDU moves to the right, or for one MDU to continue travelling in a given direction while the other MDU reverses its direction.

In at least one embodiment, as tasks are being performed by the MDUs of the inventory system, individual MDUs may report obstacle information to the centralized management module. For example, an MDU in the course of performing its assigned task, may encounter an obstacle (e.g., a fallen package on the floor of the storage facility, a human, etc.). In at least one example, the MDU may provide obstacle information (e.g., sensor data related to the obstacle, a location of the MDU, a location of the obstacle, an obstacle type, or the like) to the management module. In some cases, providing the obstacle information may constitute a request by the MDU for further instructions, while in other cases, the MDU may transmit a separate request for further instructions to the management module. In still further examples where the obstacle does not block the MDUs path, the MDU may provide the obstacle information and proceed along its assigned path without requesting further instructions from the management module. In at least one example, other obstacle sensing devices (e.g., cameras, infra-red sensors, etc. affixed to stationary and/or moveable/moving objects) may generate obstacle information which may be received by the management module. The management module may utilize any received obstacle information to assign new tasks to MDUs/humans (e.g., clear the obstacle) or may modify the paths of one or more MDUs/humans to avoid the obstacle. In some examples, the management module may determine that the obstacle is no longer a problem (e.g., another MDU has passed by the previously-detected obstacle location and did not encounter the obstacle, a period of time has elapsed, a personnel device has reported an updated location of a human, etc.). Accordingly, the management module may modify one or more paths of the MDUs/humans in order to begin utilizing the space previously thought occupied by the obstacle.

In at least one embodiment, the MDUs of the inventory system may operate in a peer-to-peer architecture in which a management module operating on each MDU may determine task assignments, paths to complete the assigned task(s), set(s) of actions to take in order to overcome contentions/obstacles encountered by the MDU (or reported by other MDUs, or reported by personnel devices), or any suitable combination of the above. In this environment, an component of the inventory system (e.g., a MDU, a personnel device, etc.) who encounters an obstacle may broadcast (or specifically address) a request to join a communication channel. The invitation may include a location of the MDU and/or the location of a contention/obstacle. Other MDUs/personnel devices may receive the request and determine, based on the location of the MDU/personnel devices and/or the contention/obstacle, whether or not to join the communication channel. For example, if an MDU is located over a threshold distance from the distance(s) indicated in the request, the MDU may ignore the request. Alternatively, if the MDU is located with a threshold distance of the location (s) indicated in the request, the MDU may transmit device information (e.g., an identifier for the MDU, a location of the MDU, a task assigned to the MDU, a priority assigned to the task, sensor data collected by the MDU, or the like) via the communication channel to the originator of the request, and/or to any other suitable MDU listening to the communication channel. In at least one example, the MDU/personnel device that first encountered the obstacle may broadcast obstacle information (e.g., after a threshold period of time has elapsed from the last time device information was received, after a threshold period of time since transmission of the request, etc.). The other MDU(s)/personnel devices who joined the communication channel may receive the obstacle information and each MDU/personnel device associated with the communication channel may determine a best course of action to take given the obstacle information. In at least one example, the MDUs/personnel devices may transmit information related to the determined best course of action so that other MDUs/personnel devices may determine a potential future contention and modify their corresponding approaches accordingly.

In at least one embodiment, individual MDUs (and/or user devices) may store in local memory, the protocol sets generated by the management module utilizing the model and historical data. The protocol sets may be utilized by the MDUs locally in order to determine, given particular obstacle information, a best course of action (e.g., update/do not update a path, halt movement, clear the obstacle, etc.).

In at least one embodiment, individual MDUs/personnel devices may store historical data (e.g., historical contention information and contention resolution information) in local memory. The MDU/personnel device may transmit such information to the management module at any suitable time (e.g., at the end of a work day, in response to a request by the management module for such information, etc.). In other examples, an MDU/personnel device may transmit such information at a time at which a task is completed for which the MDU/human was assigned. The historical data may be utilized by the management module to retrain the model in order to take into account such information.

As discussed above, in some embodiments a centralized management module, and/or a distributed management module operating on individual MDUs/personnel devices, may utilize the output of the model and/or protocol sets generated from model when making determinations as to a best course of action. In at least one embodiment, the management module may deviate from previously determined courses of action in order to attempt new approaches. For example, the management module may randomly generate commands corresponding to a set of actions that have not previously been attempted. In some examples, a new course of action may be attempted by the management module according to a predetermined periodic rate (e.g., every 5 minutes, every 10th task, etc.). Determining whether or not to attempt a new course of action may depend on a priority associated with the task assigned to the MDU/human. For example, an MDU/human who is assigned a high priority task (e.g., deliver an item to a station), in some cases, may not be utilized to determine a new course of action. Instead, the management module may opt to utilize an MDU/human that has been assigned a lower priority task (e.g., return to a docking station), that has also encountered some obstacle, in order to attempt a new course of action. Accordingly, the management module may reduce the risk of delaying a high priority task during its attempt to add new courses of action to the historical data, and eventually, the model.

It should be appreciated that the techniques discussed above are applicable in contexts other that inventory situations. The techniques disclosed herein provide, at least, a system and method for resolving contentions/obstacles encountered by one or more MDUs/personnel devices of a storage facility. Utilizing the techniques discussed herein, the inventory system may operate more efficiently with respect to the MDUs/personnel devices operating within a storage facility as task completion delays may be reduced by leveraging historical contention information and contention resolution information to determine a best course of action to take with respect to a particular contention/obstacle.

Embodiment of the present invention may provide numerous benefits over previous techniques. For example, the management module described herein may provide the inventory system the ability to determine resolutions to conflicts/obstacles encountered by the MDUs/humans whilst executing their respective tasks. While in old systems, the MDUs/humans may lose time waiting to determine whether or not the obstacle has moved, or avoid whole areas, current techniques described herein allow the MDUs/humans to be rerouted, re-tasked, or the like. Accordingly, the management module improves overall inventory system throughput. Additionally, current techniques allow the inventory system to recover previously inaccessible areas of the storage facility potentially quicker than previous systems. For example, other MDUs/humans passing by a location of a previously encountered obstacle may update the system that the obstacle no longer poses a problem and the area may be recovered increasing the overall useable space of the warehouse, which it turn may increase performance of the warehouse as a whole. Additionally, methods discussed herein enable paths generated for each MDU/human to be factors in determining paths for other MDUs/humans in the system. These techniques may enable the system to decrease the potentiality of contentions arising. Still further, the machine learning techniques discussed herein enable the inventory system to learn from past attempts to resolve a contention/obstacle. Past attempts that were not particularly successful may be avoided, new approaches may be attempted and the system may learn better, more efficient ways of resolving contentions/obstacles within the storage facility. Thus, the systems and methods provided herein enables the management module to perform contention resolution dynamically with respect to stationary and moveable/moving obstacles in a every changing workspace.

FIG. 1 is a schematic diagram illustrating an example environment suitable for implementing aspects of an inventory system 10, in accordance with at least one embodiment. As a non-limiting example, the inventory system 10 may include a management module 15, one or more mobile drive units (e.g., mobile drive unit 20-1, mobile drive unit 20-2, mobile drive unit 20-3, mobile drive unit 20-4, and mobile drive unit 20-5, hereinafter referred to as "mobile drive units 20"), one or more inventory holders 30, and one or more inventory stations 50. The mobile drive units 20 may transport inventory holders 30 between points within a workspace 70 (e.g., a warehouse, a storage facility, or the like) in response to commands communicated by management module 15. While the management module 15 is depicted in FIG. 1 as being separate from the mobile drive units 20, it should be appreciated that the management module 15, or at least some aspects of the management module 15, may be additionally or alternatively be performed by a processor of the mobile drive units 20. Within the inventory system 10, each inventory holder 30 may store one or more types of inventory items. As a result, inventory system 10 may be capable of moving inventory items between locations within the workspace 70 to facilitate the entry, processing, and/or removal of inventory items from inventory system 10 and the completion of other tasks involving inventory items.

In at least one embodiment, the management module 15 may assign tasks to appropriate components of inventory system 10 and coordinates operation of the various components in completing the tasks. These tasks may relate not only to the movement and processing of inventory items, but also to the management and maintenance of the components of the inventory system 10. For example, the management module 15 may assign portions of the workspace 70 as parking spaces for the mobile drive units 20, the scheduled recharge or replacement of mobile drive unit batteries, the storage of empty inventory holders 30, or any other operations associated with the functionality supported by inventory system 10 and its various components. The management module 15 may select components of inventory system 10 to perform these tasks and communicate appropriate commands and/or data to the selected components to facilitate completion of these operations. Although shown in FIG. 1 as a single, discrete component, the management module 15 may represent multiple components and may represent or include portions of the mobile drive units 20 or other elements of the inventory system 10. As a result, any or all of the interactions between a particular mobile drive unit 20 and the management module 15 that are described below may, in particular embodiments, may represent peer-to-peer communication between that mobile drive unit 20 and one or more other mobile drive units 20. The components and operation of an example embodiment of management module 15 are discussed further below with respect to FIG. 12.

The mobile drive units 20 may move inventory holders 30 between locations within the workspace 70. The mobile drive units 20 may represent any devices or components appropriate for use in the inventory system 10 based on the characteristics and configuration of the inventory holders 30 and/or other elements of inventory system 10. In a particular embodiment of inventory system 10, the mobile drive units 20 represent independent, self-powered devices configured to freely move about the workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 20 represent elements of a tracked inventory system configured to move the inventory holder 30 along tracks, rails, cables, crane system, or other guidance or support elements traversing the workspace 70. In such an embodiment, the mobile drive units 20 may receive power and/or support through a connection to the guidance elements, such as a powered rail. Additionally, in particular embodiments of the inventory system 10 the mobile drive units 20 may be configured to utilize alternative conveyance equipment to move within the workspace 70 and/or between separate portions of the workspace 70. The components and operation of an example embodiment of a mobile drive unit are discussed further below with respect to FIGS. 2 and 3.

Additionally, the mobile drive units 20 may be capable of communicating with the management module 15 to receive information identifying selection of the inventory holders 30, transmit the locations of the mobile drive units 20, or exchange any other suitable information to be used by the management module 15 or the mobile drive units 20 during operation (e.g., historical data including historical contention information and/or contention resolution information. The mobile drive units 20 may communicate with the management module 15 wirelessly, using wired connections between the mobile drive units 20 and the management module 15, and/or in any other appropriate manner. As one example, particular embodiments of the mobile drive unit 20 may communicate with the management module 15 and/or with one another using 802.11, Bluetooth, or Infrared Data Association (IrDA) standards, or any other appropriate wireless communication protocol. As another example, in a tracked inventory system 10, tracks or other guidance elements upon which the mobile drive units 20 move may be wired to facilitate communication between the mobile drive units 20 and other components of the inventory system 10. Furthermore, as noted above, the management module 15 may include components of individual mobile drive units 20. Thus, for the purposes of this description and the claims that follow, communication between the management module 15 and a particular mobile drive unit 20 may represent communication between components of a particular mobile drive unit 20. In general, the mobile drive units 20 may be powered, propelled, and controlled in any manner appropriate based on the configuration and characteristics of the inventory system 10.

In at least one embodiment, the inventory holders 30 store inventory items. In a particular embodiment, the inventory holders 30 may include multiple storage bins with each storage bin capable of holding one or more types of inventory items. The inventory holders 30 are capable of being carried, rolled, and/or otherwise moved by the mobile drive units 20. In particular embodiments, the inventory holder 30 may provide additional propulsion to supplement that provided by the mobile drive unit 20 when moving inventory holder 30.

Additionally, in particular embodiments, the inventory items may also hang from hooks or bars (not shown) within or on the inventory holder 30. In general, the inventory holder 30 may store inventory items in any appropriate manner within the inventory holder 30 and/or on the external surface of the inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. The mobile drive unit 20 may be configured to rotate the inventory holder 30 at appropriate times to present a particular face and the bins associated with that face to an operator or other components of the inventory system 10.

In at least one embodiment, the inventory items represent any objects suitable for storage, retrieval, and/or processing in an automated inventory system 10. For the purposes of this description, "inventory items" may represent any one or more objects of a particular type that are stored in the inventory system 10. Thus, a particular inventory holder 30 is currently "storing" a particular inventory item if the inventory holder 30 currently holds one or more units of that type. As one example, the inventory system 10 may represent a mail order warehouse facility (e.g., operated by an electronic marketplace provider), and inventory items may represent merchandise stored in the warehouse facility. During operation, the mobile drive units 20 may retrieve the inventory holders 30 containing one or more inventory items requested in an order to be packed for delivery to a customer or the inventory holders 30 carrying pallets containing aggregated collections of inventory items for shipment. Moreover, in particular embodiments of the inventory system 10, boxes containing completed orders may themselves represent inventory items.

In particular embodiments, the inventory system 10 may also include one or more inventory stations 50. The inventory stations 50 represent locations designated for the completion of particular tasks involving inventory items. Such tasks may include the removal of inventory items from the inventory holders 30, the introduction of inventory items into the inventory holders 30, the counting of inventory items in the inventory holders 30, the decomposition of inventory items (e.g. from pallet- or case-sized groups to individual inventory items), the consolidation of inventory items between the inventory holders 30, and/or the processing or handling of inventory items in any other suitable manner. In particular embodiments, the inventory stations 50 may represent the physical locations where a particular task involving inventory items can be completed within the workspace 70. In alternative embodiments, the inventory stations 50 may represent both the physical location and also any appropriate equipment for processing or handling inventory items, such as scanners for monitoring the flow of inventory items in and out of the inventory system 10, communication interfaces for communicating with the management module 15, and/or any other suitable components. The inventory stations 50 may be controlled, entirely or in part, by human operators or may be fully automated. Moreover, the human or automated operators of the inventory stations 50 may be capable of performing certain tasks involving inventory items, such as packing, counting, or transferring inventory items, as part of the operation of the inventory system 10.

In at least one embodiment, the workspace 70 represents an area associated with the inventory system 10 in which the mobile drive units 20 can move and/or the inventory holders 30 can be stored. For example, the workspace 70 may represent all or part of the floor of a mail-order warehouse in which the inventory system 10 operates. Although FIG. 1 shows, for the purposes of illustration, an embodiment of the inventory system 10 in which the workspace 70 includes a fixed, predetermined, and finite physical space, particular embodiments of the inventory system 10 may include the mobile drive units 20 and the inventory holders 30 that are configured to operate within the workspace 70 that is of variable dimensions and/or an arbitrary geometry. While FIG. 1 illustrates a particular embodiment of the inventory system 10 in which the workspace 70 is entirely enclosed in a building, alternative embodiments may utilize the workspace 70 in which some or all of the workspace 70 is located outdoors, within a vehicle (such as a cargo ship), or otherwise unconstrained by any fixed structure.

In operation, the management module 15 may select appropriate components (e.g., MDUs, humans associated with personnel devices, etc.) to complete particular tasks and may transmit task assignments 18 to the selected components to trigger completion of the relevant tasks. Each of the task assignments 18 defines one or more tasks to be completed by a particular component. These tasks may relate to the retrieval, storage, replenishment, and counting of inventory items and/or the management of the mobile drive units 20, the inventory holders 30, the inventory stations 50 and other components of the inventory system 10. Depending on the component and the task to be completed, a particular task assignment 18 may identify locations, components, and/or actions/commands associated with the corresponding task and/or any other appropriate information to be used by the relevant component in completing the assigned task.

In particular embodiments, the management module 15 may generate task assignments 18 based, in part, on inventory requests that the management module 15 receives from other components of the inventory system 10 and/or from external components in communication with the management module 15. These inventory requests identify particular operations to be completed involving inventory items stored or to be stored within the inventory system 10 and may represent communication of any suitable form. For example, in particular embodiments, an inventory request may represent a shipping order specifying particular inventory items that have been purchased by a customer and that are to be retrieved from the inventory system 10 for shipment to the customer. The management module 15 may also generate the task assignments 18 independently of such inventory requests, as part of the overall management and maintenance of the inventory system 10. For example, the management module 15 may generate the task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of the inventory system 10. After generating one or more of the task assignments 18, the management module 15 may transmit the generated task assignments 18 to appropriate components for completion of the corresponding task. The relevant components may then execute their assigned tasks.

With respect to the mobile drive units 20 specifically, the management module 15 may, in particular embodiments, communicate task assignments 18 to selected mobile drive units 20 that identify one or more destinations for the selected mobile drive units 20. The management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of the inventory system 10. For example, in particular embodiments, such decisions may be based on the popularity of particular inventory items, the staffing of a particular inventory station 50, the tasks currently assigned to a particular mobile drive unit 20, and/or any other appropriate considerations. The management module 15 may, in particular embodiments, provide task management functionality with respect to personnel devices in a similar manner as described above with respect to mobile drive units 20.

As part of completing these tasks the mobile drive units 20 may dock with and transport the inventory holders 30 within the workspace 70. The mobile drive units 20 may dock with the inventory holders 30 by connecting to, lifting, and/or otherwise interacting with the inventory holders 30 in any other suitable manner so that, when docked, the mobile drive units 20 are coupled to and/or support the inventory holders 30 and can move the inventory holders 30 within the workspace 70. The mobile drive unit 20 and inventory holder 30 may be configured to dock in any manner suitable to allow the mobile drive unit 20 to move the inventory holder 30 within workspace 70. Additionally, as noted below, in particular embodiments, the mobile drive units 20 represent all or portions of the inventory holders 30. In such embodiments, the mobile drive units 20 may not dock with the inventory holders 30 before transporting the inventory holders 30 and/or the mobile drive units 20 may each remain continually docked with a particular inventory holder 30.

While the appropriate components (e.g., MDUs, humans associated with personnel devices, etc.) of inventory system 10 complete assigned tasks, the management module 15 may interact with the relevant components (e.g., MDUs, personnel devices, etc.) to ensure the efficient use of space, equipment, manpower, and other resources available to inventory system 10. As one specific example of such interaction, management module 15 is responsible, in particular embodiments, for planning the paths the mobile drive units 20 take when moving within the workspace 70 and for allocating use of a particular portion of the workspace 70 to a particular mobile drive unit 20 for purposes of completing an assigned task. In such embodiments, the mobile drive units 20 may, in response to being assigned a task, request a path to a particular destination associated with the task. Moreover, while the description below focuses on one or more embodiments in which the mobile drive unit 20 receives paths from a centralized management module, the mobile drive unit 20 may, in alternative embodiments, generate its own paths. The management module 15 may, in particular embodiments, provide path planning functionality with respect to personnel devices in a similar manner as described above with respect to mobile drive units 20.

Components of the inventory system 10 (e.g., MDUs, personnel devices, etc.) may provide information to the management module 15 regarding their current state, other components of the inventory system 10 with which they are interacting, and/or other conditions relevant to the operation of the inventory system 10 (e.g., historical contention information, contention resolution information, obstacle information, sensor data, and the like). This may allow the management module 15 to utilize feedback from the relevant components to update algorithm parameters, adjust policies, retrain a statistical model, or otherwise modify its decision-making to respond to changes in operating conditions or the occurrence of particular events.

In addition, while the management module 15 may be configured to manage various aspects of the operation of the components of the inventory system 10 (e.g., MDUs, personnel devices, etc.), in particular embodiments, the components themselves may also be responsible for decision-making relating to certain aspects of their operation, thereby reducing the processing load on the management module 15.

Thus, based on its knowledge of the location, current state, and/or other characteristics of the various components of the inventory system 10 (e.g., MDUs, personnel devices, etc.) and an awareness of all the tasks currently being completed, the management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 10 may be able to support a number of techniques for efficiently executing various aspects of the operation of the inventory system 10. As a result, particular embodiments of the management module 15 may, by implementing one or more management techniques described below, enhance the efficiency of the inventory system 10 and/or provide other operational benefits.

In at least one embodiment, the management module 15 may generate a statistical model utilizing at least one machine learning technique (e.g., a regression algorithm, a genetic algorithm, a random forest algorithm, or the like) and historical data associated with the mobile drive units 20 (and/or personnel devices). The historical data may be utilized generate and train the model that may determine a best course of action when attempting to resolve a contention/obstacle based on a particular set of inputs. In at least one embodiment, the management module 15 may utilize the model to generate and store protocol sets corresponding to a set of actions to take given a particular set of inputs.

In at least one embodiment, the management module 15 (operating on a separate system from the mobile drive units 20 or as distributed components of the mobile drive units 20) may determine that a contention 80 exists between two MDUs (e.g., the mobile drive unit 20-2 and the mobile drive unit 20-3. In a non-limiting example, the contention 80 indicates that the mobile drive unit 20-2 and the mobile drive unit 20-3 may attempt to access the same area within the workspace 70 at substantially the same time. The management module 15 may, in some examples, detect the contention 80 during a process for determining paths and/or allocating/reserving space within the workspace 70 for one or more MDUs. Upon detection of the contention 80, the management module may collect information related to the contention 80 and the mobile drive unit 20-2 (e.g., obstacle information) and provide such information as input into the pre-generated model. The model, given such input, may identify a best course of action for the mobile drive unit 20-2. Similarly the management module 15 may collect information related to the contention 80 and the mobile drive unit 20-2 (e.g., obstacle information) and provide such information to the model in order to identify a best course of action for the mobile drive unit 20-2. The above example may equally apply to situations in which a contention exists between one or more humans and/or one or more MDUs. In contentions involving humans the functionality described above may be provided by the separate system from the personnel device(s) and/or as distributed components of the personnel device(s).

In at least one embodiment, the mobile drive units 20 may report obstacles to the management module 15 in order to incorporate such data into determinations performed by the management module 15. For example, the mobile drive unit 20-4, in the course of performing a task, may pass by an obstacle 90 at a particular location within the workspace 70. The mobile drive unit 20-4 may transmit the obstacle information (e.g., obstacle location, obstacle type (if known), sensor data related to the obstacle, etc.) to the management module 15. The management module 15 may utilize the model to determine a best course of action to overcome the obstacle. For example, the model may indicate that the best course of action, given the particular attributes of the obstacle, is to update the paths of any of the mobile drive units 20 currently assigned paths that may overlap with the location of the obstacle 90. Accordingly, all, or at least some of the mobile drive units 20 may avoid the location of the obstacle 90. In another example, the model may indicate that the best course of action for the particular obstacle is to assign a mobile drive unit to clear the obstacle. Accordingly, a mobile drive unit may be tasked with the assignment. A mobile drive unit who clears the obstacle 90 (e.g., the mobile drive unit 20-5) may transmit information to the management module 15 indicating that the obstacle has been cleared. In other examples, the management module 15 may ascertain that the obstacle is cleared by determining that a mobile drive unit has passed relatively near the location of the obstacle 90 and did not transmit obstacle information. In still further examples, a mobile drive unit passing by the location of the obstacle 90 may affirmatively report to the management module 15 that the obstacle 90 is no longer at the location. In at least one example, the management module 15 may modify one or more paths and/or tasks of the mobile drive units 20 upon determining that the obstacle 90 no longer exists. It should be appreciated that, in particular embodiments, obstacle information may be additionally, or alternatively, generated by other obstacle sensing devices (e.g., an aerial camera affixed to the structure of the storage facility, a camera at an inventory station 50, a personnel device of a human, etc.)

In at least one embodiment, obstacle information may include device malfunction information. For example, the mobile drive unit 20-1 may hit a patch of liquid on the ground which may cause mobile drive unit 20-1 to decrease speed or be incapable of movement. In other examples, the mobile drive unit 20-1 may detect some other malfunction (e.g., low battery, motor malfunction, etc.) and transmit such data to the management module 15. Upon receipt, as in the previous examples, the management module 15 may consult the protocol sets and/or the generated model to determine a best course of action given the particular input. As a non-limiting example, the management module 15 may determine, utilizing the model and/or protocol sets, that the best course of action for the mobile drive unit 20-1, which cannot move due to liquid on the ground, should be to remain stationary. The management module 15 may further task another mobile drive unit (e.g., the mobile drive unit 20-5) to come clean up the liquid (e.g., utilizing sponges or other drying materials/mechanisms) and/or to push or otherwise aid the mobile drive unit 20-1 through the liquid such that the mobile drive unit 20-1 becomes mobile once again.

In at least one embodiment, components of the inventory system 10 may include one or more obstacle sensing devices (e.g., one or more cameras, infra-red sensors, or the like) that may distributed throughout the workspace 70 at various locations. For example, a camera may be affixed to inventory stations 50, a storage container (e.g., an inventory holder 30) under the control of an MDU, and/or a storage cart or other suitable object under the control of a human being. In another example embodiment, a device (e.g., personnel device) may be carried or otherwise attached to a human being within the workspace 70. Accordingly, such obstacle sensing devices may be stationary or moveable and/or may be attached to a moveable object (e.g., an inventory holder 30, a cart, a person, etc.). In at least one embodiment, the one or more obstacle sensing devices may produce obstacle information corresponding to obstacles observed in the workspace 70. For example, a camera affixed to an inventory station 50 may produce obstacle information corresponding to a fallen package on the floor within a threshold distance of the inventory station 50. As another non-limiting example, an personnel device (e.g., including a camera, an infra-red sensor, or the like) attached to a human may capture obstacle information corresponding to an object within a field of view or other sensing distance of the device (e.g., a fallen package, one or more MDUs, a patch of fluid, etc.). Such obstacle information may be received by the management module 15 and utilized in a similar manner as described above to determine a best course of action for one or more MDUs of the inventory system 10. In some examples, obstacle information received by such obstacle sensing devices (not associated with an MDU), may be utilized in conjunction with obstacle information provided by other sources (e.g., sensors of an MDU) to utilize the obstacle information received from all, or some set the components of the inventory system 10, to determine a best course of action for one or more MDUs and/or humans of the inventory system 10.

Many possible scenarios may be possible, a few of which will be discussed further below with respect to FIGS. 4-7.

Figure 2:
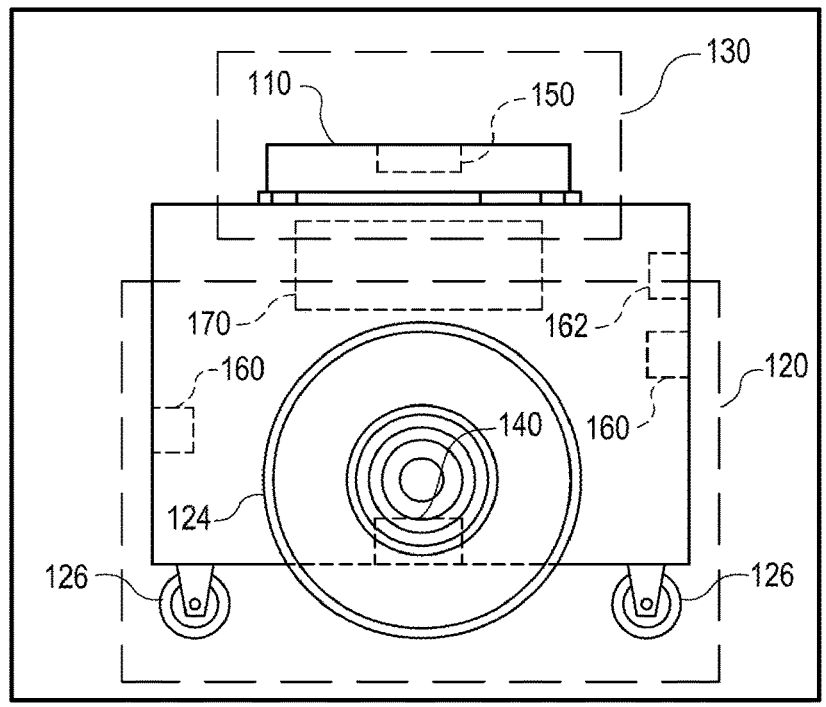
FIGS. 2 and 3 illustrate in greater detail an example mobile drive unit that may be utilized in particular embodiments of the inventory system shown in FIG. 1.
Figure 3:
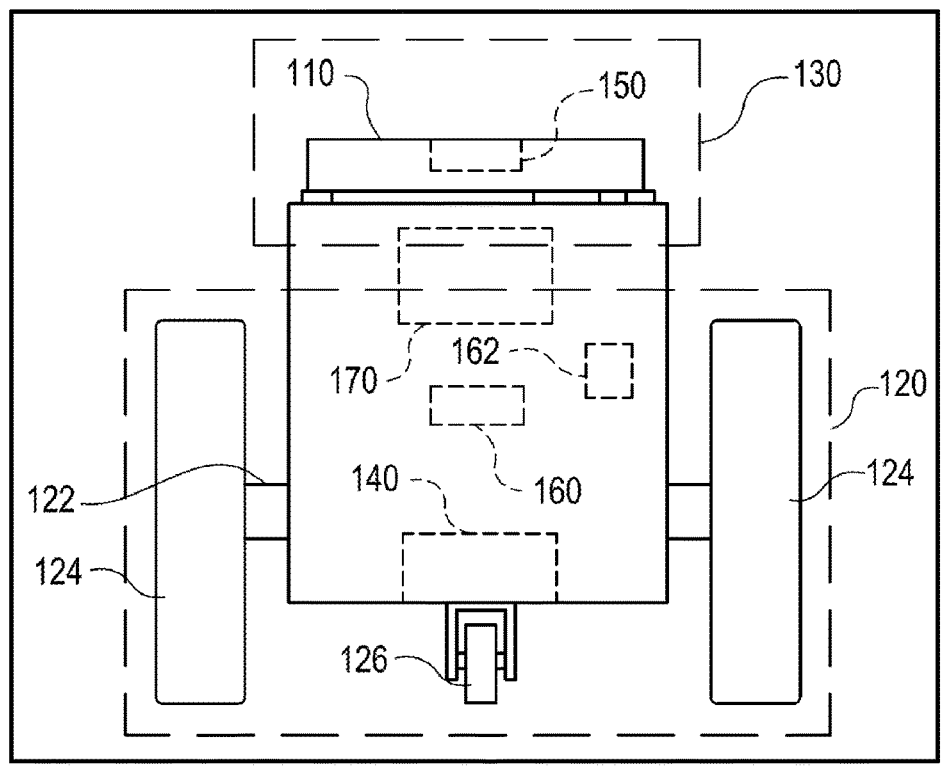

FIGS. 2 and 3 illustrate in greater detail the components of a particular embodiment of a mobile drive unit (e.g., the mobile drive unit 20 of FIG. 1). In particular, FIGS. 2 and 3 include a front and side view of an example mobile drive unit 20. The mobile drive unit 20 may include a docking head 110, a drive module 120, a docking actuator 130, and a control module 170. Additionally, the mobile drive unit 20 may include one or more sensors configured to detect or determine the location of the mobile drive unit 20, the inventory holder 30, and/or other appropriate elements of the inventory system 10 of FIG. 1. In the illustrated embodiment, the mobile drive unit 20 includes a position sensor 140, a holder sensor 150, an obstacle sensor 160, and an identification signal transmitter 162.

The docking head 110, in particular embodiments of the mobile drive unit 20, couples the mobile drive unit 20 to the inventory holder 30 and/or supports the inventory holder 30 when the mobile drive unit 20 is docked to the inventory holder 30. The docking head 110 may additionally allow the mobile drive unit 20 to maneuver the inventory holder 30, such as by lifting the inventory holder 30, propelling the inventory holder 30, rotating the inventory holder 30, and/or moving the inventory holder 30 in any other appropriate manner. The docking head 110 may also include any appropriate combination of components, such as ribs, spikes, and/or corrugations, to facilitate such manipulation of the inventory holder 30. For example, in particular embodiments, the docking head 110 may include a high-friction portion that abuts a portion of the inventory holder 30 while the mobile drive unit 20 is docked to the inventory holder 30. In such embodiments, frictional forces created between the high-friction portion of the docking head 110 and a surface of the inventory holder 30 may induce translational and rotational movement in the inventory holder 30 when the docking head 110 moves and rotates, respectively. As a result, the mobile drive unit 20 may be able to manipulate the inventory holder 30 by moving or rotating the docking head 110, either independently or as a part of the movement of the mobile drive unit 20 as a whole.

The drive module 120 may propel the mobile drive unit 20 and, when the mobile drive unit 20 and the inventory holder 30 are docked, the inventory holder 30. The drive module 120 may represent any appropriate collection of components operable to propel the mobile drive unit 20. For example, in the illustrated embodiment, the drive module 120 includes a motorized axle 122, a pair of motorized wheels 124, and a pair of stabilizing wheels 126. One motorized wheel 124 may be located at each end of the motorized axle 122, and one stabilizing wheel 126 may be positioned at each end of the mobile drive unit 20.

The docking actuator 130 may move the docking head 110 towards the inventory holder 30 to facilitate docking of the mobile drive unit 20 and the inventory holder 30. The docking actuator 130 may also be capable of adjusting the position or orientation of the docking head 110 in other suitable manners to facilitate docking. The docking actuator 130 may include any appropriate components, based on the configuration of the mobile drive unit 20 and the inventory holder 30, for moving the docking head 110 or otherwise adjusting the position or orientation of the docking head 110. For example, in the illustrated embodiment, the docking actuator 130 includes a motorized shaft (not shown) attached to the center of the docking head 110. The motorized shaft is operable to lift the docking head 110 as appropriate for docking with the inventory holder 30.

The drive module 120 may be configured to propel the mobile drive unit 20 in any appropriate manner. For example, in the illustrated embodiment, the motorized wheels 124 are operable to rotate in a first direction to propel the mobile drive unit 20 in a forward direction. The motorized wheels 124 are also operable to rotate in a second direction to propel the mobile drive unit 20 in a backward direction. In the illustrated embodiment, the drive module 120 is also configured to rotate the mobile drive unit 20 by rotating the motorized wheels 124 in different directions from one another or by rotating the motorized wheels 124 at different speeds from one another.

The position sensor 140 represents one or more sensors, detectors, or other components suitable for determining the location of mobile drive unit 20 in any appropriate manner. For example, in particular embodiments, the workspace 70 associated with the inventory system 10 includes a number of fiducial marks that mark points on a two-dimensional grid that covers all or a portion of the workspace 70. In such embodiments, the position sensor 140 may include a camera and suitable image- and/or video-processing components, such as an appropriately-programmed digital signal processor, to allow the position sensor 140 to detect fiducial marks within the camera's field of view. The control module 170 may store location information that the position sensor 140 updates as the position sensor 140 detects fiducial marks. As a result, the position sensor 140 may utilize fiducial marks to maintain an accurate indication of the location the mobile drive unit 20 and to aid in navigation when moving within the workspace 70. In at least one example, the control module 170 may cause a historical record corresponding to the location information to be stored on local memory of the mobile drive unit 20. The control module 170 may further be configured to transmit/communicate the historical record at any suitable time to the management module.

The holder sensor 150 represents one or more sensors, detectors, or other components suitable for detecting the inventory holder 30 and/or determining, in any appropriate manner, the location of the inventory holder 30, as an absolute location or as a position relative to the mobile drive unit 20. The holder sensor 150 may be capable of detecting the location of a particular portion of the inventory holder 30 or the inventory holder 30 as a whole. The mobile drive unit 20 may then use the detected information for docking with or otherwise interacting with the inventory holder 30.

The obstacle sensor 160 may represent one or more sensors capable of detecting objects located in one or more different directions in which the mobile drive unit 20 is capable of moving. The obstacle sensor 160 may utilize any appropriate components and techniques, including optical, radar, sonar, pressure-sensing and/or other types of detection devices appropriate to detect objects located in the direction of travel of the mobile drive unit 20. In particular embodiments, the obstacle sensor 160 may transmit information describing objects it detects to the control module 170 to be used by the control module 170 to identify obstacles and to take appropriate remedial actions to prevent mobile drive unit 20 from colliding with obstacles and/or other objects. In at least one embodiment, the obstacle sensor 160, or another component of the mobile drive unit 20 may communicate information to a management module (e.g., the management module 15 of FIG. 1). In some examples, the management module 15 may utilize such information to determine remedial actions in order to resolve contention produced by the sensed obstacles. In at least one example, the control module 170 may cause a historical record to be updated with sensor data collected by the obstacle sensor 160. Such data (e.g., obstacle information may be stored with data indicating historical locations of the mobile drive unit 20 collected by the positions sensor 140. The control module 170 may further be configured to transmit/communicate the historical record, including the obstacle data, at any suitable time to the management module.

The obstacle sensor 160 may also detect signals transmitted by other mobile drive units 20 operating in the vicinity of the illustrated the mobile drive unit 20. For example, in particular embodiments of the inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. The identification signal transmitter 162 may be capable of transmitting infrared, ultraviolet, audio, visible light, radio, and/or other suitable signals that indicate to recipients that the transmitting device is a mobile drive unit 20. Such data (e.g., obstacle data) may be transmitted or otherwise communicated to the management module at any suitable time to be utilized by the management module for contention resolution.

Additionally, in particular embodiments, the obstacle sensor 160 may also be capable of detecting state information transmitted by other mobile drive units 20. For example, in particular embodiments, the identification signal transmitter 162 may be capable of including state information relating to the mobile drive unit 20 in the transmitted identification signal. This state information may include, but is not limited to, the position, velocity, direction, and the braking capabilities of the transmitting mobile drive unit 20. In particular embodiments, the mobile drive unit 20 may use the state information transmitted by other mobile drive units to avoid collisions when operating in close proximity with those other mobile drive units.

The control module 170 may monitor and/or control operation of the drive module 120 and the docking actuator 130. The control module 170 may also receive information from sensors such as the position sensor 140 and the holder sensor 150 and adjust the operation of the drive module 120, the docking actuator 130, and/or other components of the mobile drive unit 20 based on this information. Additionally, in particular embodiments, the mobile drive unit 20 may be configured to communicate with a management device of the inventory system 10 and the control module 170 may receive commands transmitted to the mobile drive unit 20 and communicate information back to the management device utilizing appropriate communication components of the mobile drive unit 20.

In some embodiments, the control module 170 may be configured to transmit and receive communication channel requests/responses to/from other mobile drive units. For example, upon receiving sensor data from the obstacle sensor 160 indicating an obstacle (e.g., the obstacle 90 of FIG. 1), the control module 170 may be configured to transmit a communication channel request that identifies a particular communication channel (e.g., frequency, topic, etc.) for which communications regarding the obstacle will be conducted. The control module 170 may further be configured to receive communication channel responses indicating one or more mobile drive units are listening on the communication channel. The control module 170 may further be configured to transmit obstacle information (e.g., sensor data of the obstacle sensor 160) via the communication channel or the control module 170 may cause the obstacle sensor 160 to transmit such data via the communication channel. In some examples, the control module 170 may be configured to receive device information from other mobile drive units via the communication channel.

The control module 170 may include any appropriate hardware and/or software suitable to provide the described functionality (e.g., for example, the functionality described in connection with the management module 15). In particular embodiments, the control module 170 includes a general-purpose microprocessor programmed to provide the described functionality. Additionally, the control module 170 may include all or portions of the docking actuator 130, the drive module 120, the position sensor 140, and/or the holder sensor 150, and/or share components with any of these elements of the mobile drive unit 20.

Moreover, in particular embodiments, the control module 170 may include hardware and software located in components that are physically distinct from the device that houses the drive module 120, the docking actuator 130, and/or the other components of the mobile drive unit 20 described above. For example, in particular embodiments, each mobile drive unit 20 operating in the inventory system 10 may be associated with a software process (referred to here as a "drive agent") operating on a server that is in communication with the device that houses the drive module 120, the docking actuator 130, and other appropriate components of the mobile drive unit 20. This drive agent may be responsible for requesting and receiving tasks, requesting and receiving routes, transmitting state information associated with the mobile drive unit 20, and/or otherwise interacting with the management module 15 and other components of the inventory system 10 on behalf of the device that physically houses the drive module 120, the docking actuator 130, and the other appropriate components of the mobile drive unit 20. As a result, for the purposes of this description and the claims that follow, the term "mobile drive unit" includes software and/or hardware, such as agent processes, that provides the described functionality on behalf of the mobile drive unit 20 but that may be located in physically distinct devices from the drive module 120, the docking actuator 130, and/or the other components of the mobile drive unit 20 described above.

In particular embodiments, the mobile drive unit 20 may represent all or a portion of inventory holder 30. The inventory holder 30 may include motorized wheels or any other components suitable to allow the inventory holder 30 to propel itself. As one specific example, a portion of the inventory holder 30 may be responsive to magnetic fields. The inventory system 10 may be able to generate one or more controlled magnetic fields capable of propelling, maneuvering and/or otherwise controlling the position of the inventory holder 30 as a result of the responsive portion of the inventory holder 30. In such embodiments, the mobile drive unit 20 may represent the responsive portion of the inventory holder 30 and/or the components of the inventory system 10 responsible for generating and controlling these magnetic fields. While this description provides several specific examples, the mobile drive unit 20 may, in general, represent any appropriate component and/or collection of components configured to transport and/or facilitate the transport of the inventory holders 30.

Figure 4:
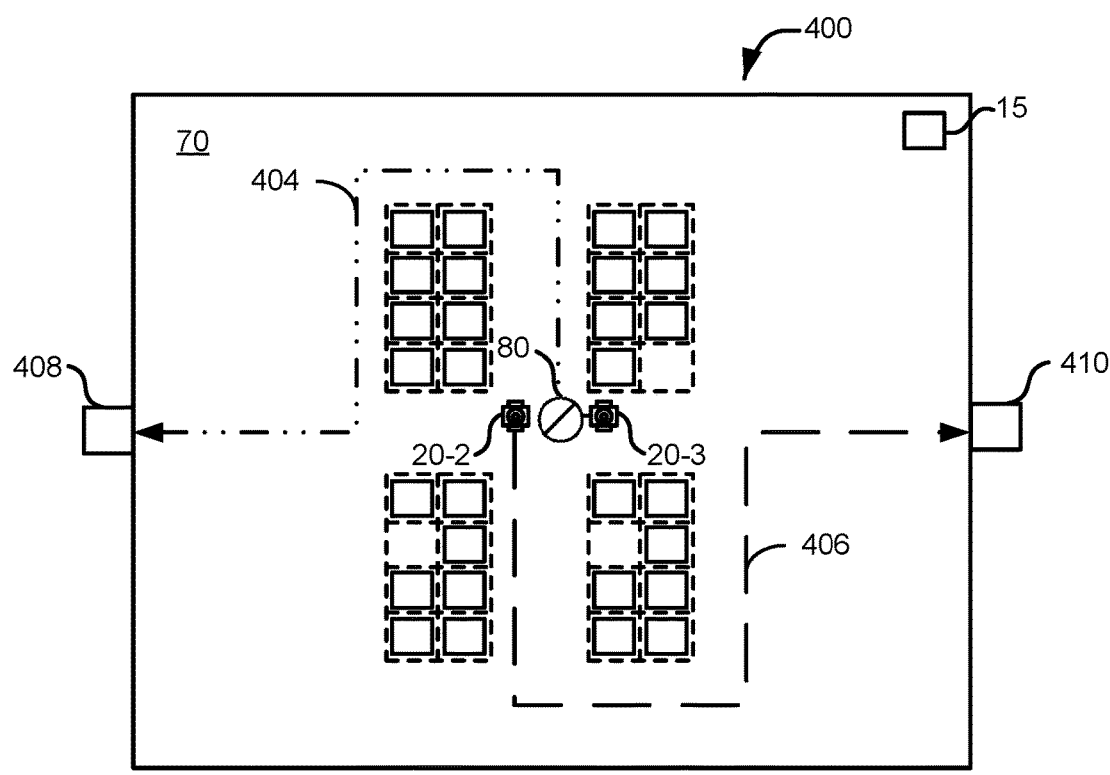
FIGS. 4 and 5 illustrate example environments suitable for implementing contention resolution aspects of a management module, in accordance with at least one embodiment.
Figure 5:
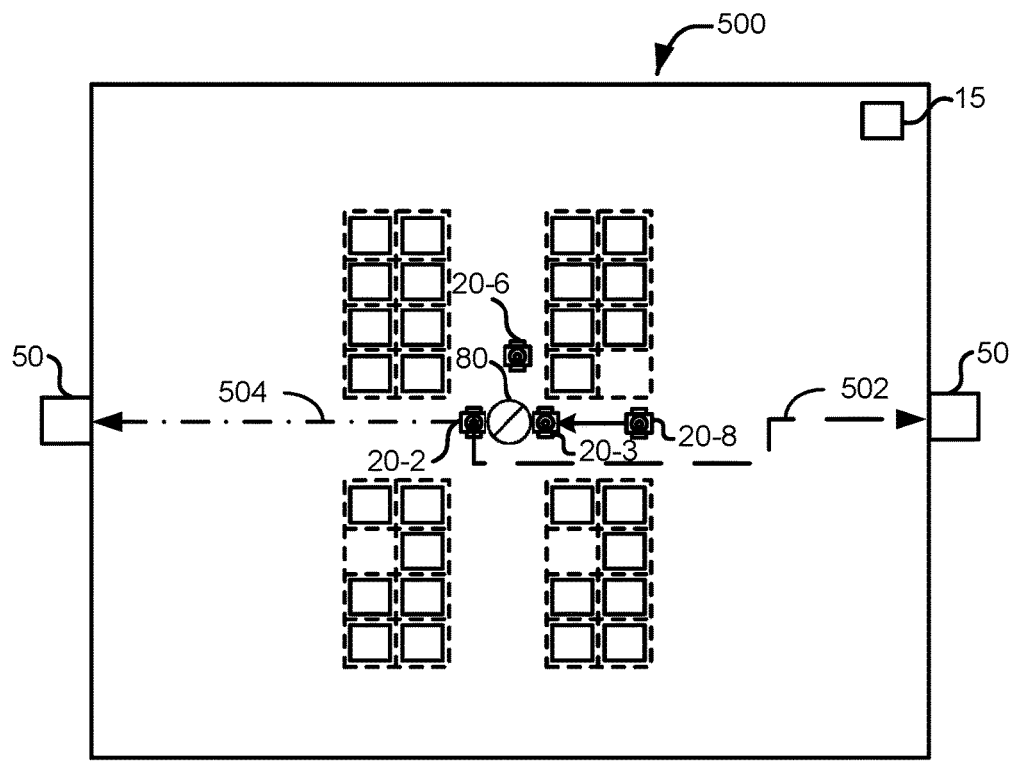

FIGS. 4 and 5 illustrate example environments (400 and 500, respectively) suitable for implementing contention resolution aspects of a management module 15, in accordance with at least one embodiment. For example, FIG. 4 illustrates an example in which two MDUs (e.g., mobile drive unit 20-2 and mobile drive unit 20-3) may individually be assigned tasks by the management module 15. It should be appreciated that the example illustrated in FIG. 4 may equally apply to any suitable combination of MDUs and humans (utilizing personnel device(s)) and that the functionality provided the management module 15 may additionally, or alternatively, be provided to and/or by a personnel device. During performance of their respective tasks, a contention (e.g., contention 80) may arise between the two MDUs. The contention 80 may arise due to the mobile drive unit 20-2 and the mobile drive unit 20-3 attempting to access and/or reserve the same area within the workspace 70 at substantially the same time.

In at least one embodiment, the management module 15 (operating as a centralized management module or operating as separate components of the mobile drive unit 20-2 and the mobile drive unit 20-3) may detect the contention 80 in response to attempts to reserve the same space of the workspace 70 by both the mobile drive unit 20-2 and the mobile drive unit 20-3. Upon detection of the contention 80, the management module 15 may access a computer-generated model that has been trained on historical data associated with the workspace 70 and the mobile drive units 20. The historical data may include historical contention information and conflict resolution information.

In accordance with at least one embodiment, obstacle information may be obtained by the management module 15. In at least one example, the management module 15 may determine the identities of the mobile drive units involved in the contention 80. The management module 15 may determine and/or receive information related to the task being performed by the respective mobile drive units. The respective tasks of the mobile drive unit 20-2 and the mobile drive unit 20-3 may be the same priority or they may have different priorities. For example, the mobile drive unit 20-2 may be tasked with delivering an item to the station 410 while the mobile drive unit 20-3 may be tasked with returning to a docking station 408. In at least some examples the task involving delivery of an item has a higher priority than a task involving returning to a docking station. The management module 15 may utilize the obstacle information as input for the computer-generated model.

As a non-limiting example, the management module 15 may identify, based on output produced from the model, that the best course of action (e.g., actions that will cause the least amount of delay with respect to task completion) for the mobile drive unit 20-2 is to continue along path 406 to the station 410. Similarly, the management module 15 may identify based on output produced from the model, that the best course of action for the mobile drive unit 20-3 is to proceed along path 404 to the docking station 408. Accordingly, the management module 15 may provide respective sets of instructions to the mobile drive unit 20-2 and the mobile drive unit 20-3 in order to bring about such results.

FIG. 5 illustrates another example environment 500 in which two MDUs (e.g., mobile drive unit 20-2 and mobile drive unit 20-3) encounter an obstacle (e.g., a contention 80). It should be appreciated that the example illustrated in FIG. 5 may equally apply to any suitable combination of MDUs and humans (utilizing personnel device(s)) and that the functionality provided the management module 15 may additionally, or alternatively, be provided to and/or by a personnel device. In the example depicted in FIG. 5, the contention 80 may be a same or different contention as the contention 80 of FIG. 4. FIG. 5 is further intended to illustrate contention resolution with respect to multiple drive units. In a non-limiting example, the mobile drive unit 20-2 and/or the mobile drive unit 20-3 may provide obstacle information to the management module 15, or the management module 15 may detect the obstacle information corresponding to locations, headings, speeds, etc. associated with other mobile drive units within a threshold distance or otherwise affected by the contention 80. For example, it may be the case that the mobile drive unit 20-2 may provide obstacle information, and/or obstacle information may be otherwise obtained that includes information regarding the mobile drive unit 20-2 (e.g., sensor data, location, etc.) as well as locations associated with the mobile drive unit 20-3, the mobile drive unit 20-6, and the mobile drive unit 20-8. In at least some embodiments, the mobile drive unit 20-3, the mobile drive unit 20-4, and the mobile drive unit 20-8 may individually provide respective obstacle information.

Utilizing the techniques described above, the management module 15 may determine the best course of action for each of the mobile drive units depicted in FIG. 5. In at least one example, the best course of action may be based on limiting delay time to particular mobile drive units (e.g., ones with tasks that have a high priority) and/or the best course of action for each mobile drive unit may be based on collectively limiting an overall delay time of the mobile drive unit with respect to completing their assigned tasks.

As a non-limiting example, the management module 15 may determine that, given the obstacle information/locations of the mobile drive units of FIG. 5, the best course of action is that the mobile drive unit 20-2 move according to path 502 (a different path than original determined for the mobile drive unit 20-2), that the mobile drive unit 20-3 move along path 504 (the same path original determined for the mobile drive unit 20-3), that the mobile drive unit 20-6 remain at its current location, and that the mobile drive unit 20-8 continue executing its original set of commands without interruption. In this particular example, the best course of action may be based, at least in part, on the mobile drive unit 20-3 having a highest priority of the mobile drive units depicted in FIG. 5. Thus, in this example, the best course of action is that the mobile drive unit 20-3 continue its task undisturbed. It may also be the case, that the task assigned to the mobile drive 20-2 may be lower priority than the priority associated with the task being performed by the mobile drive unit 20-3. Accordingly, the management module 15 may determine that it is better to make a MDU associated with a lower priority task deviate from an original path than to require an MDU associated with a higher priority to deviate from its path. In the example depicted, the task performed by the mobile drive unit 20-2 may take longer than originally expected because of the change in path.

It may further be the case, that the mobile drive unit 20-8 may have the lowest priority of the mobile drive units depicted in FIG. 5. Even though the task associated with the mobile drive unit 20-8 is of lower priority, the mobile drive unit 20-8 may be instructed to continue based on the fact that the path of the mobile drive unit 20-8 is not currently causing a contention. Accordingly, there may be no need to modify the path mobile drive unit 20-8.

Figure 6:
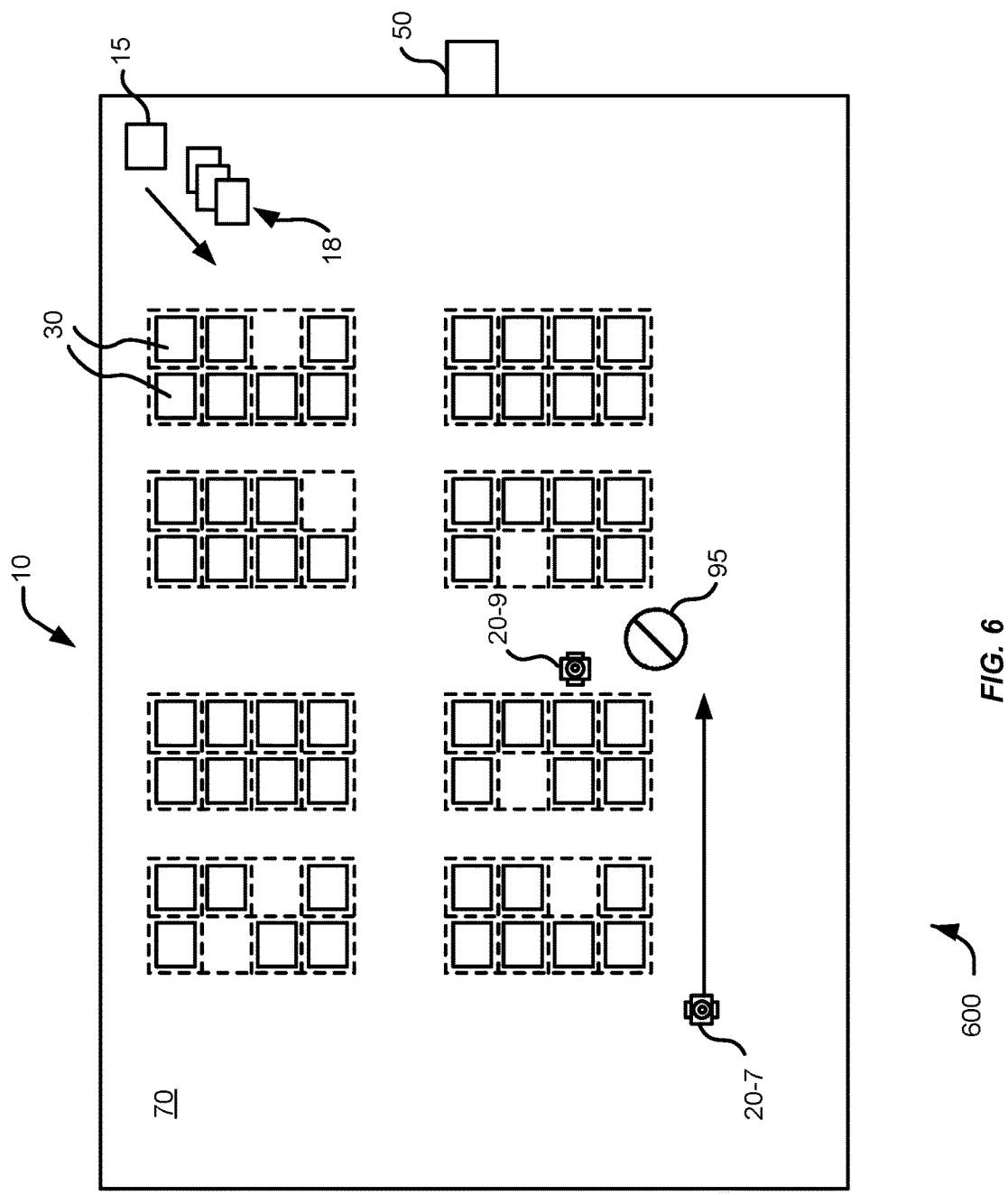
FIG. 6 illustrates another example environment suitable for implementing contention resolution aspects of the management module, in accordance with at least one embodiment.

FIG. 6 illustrates another example environment 600 suitable for implementing contention resolution aspects of the management module 15, in accordance with at least one embodiment. It should be appreciated that the example illustrated in FIG. 6 may equally apply to any suitable combination of MDUs and humans (utilizing personnel device(s)) and that the functionality provided the management module 15 may additionally, or alternatively, be provided to and/or by a personnel device. For example, while performing a task (e.g., storing an item at a location within the workspace 70) the mobile drive unit 20-9 may detect an obstacle 95. In at least one example, the obstacle 95 may be a package that has fallen from one of the inventory holders.

Upon detection of the obstacle 95, the mobile drive unit 20-9 may report the obstacle information to the management module 15. In response to receiving the obstacle information, the management module 15, utilizing a model trained on past obstacle encounters of the mobile drive units, may determine a best course of action with respect to one or more mobile drive units and the obstacle. For example, the best course of action may be that the management module 15 may update various paths of the mobile drive units 20. In another example, the management module 15 may determine that another mobile drive unit (e.g., mobile drive unit 20-7) be assigned the task of clearing the obstacle 95. The mobile drive unit 20-7, in at least one embodiment, may alert the management module 15 when the obstacle has been cleared so that the management module 15 may once again use the space previously occupied by the obstacle 95. Similarly, a mobile drive unit passing by the location of the obstacle 95 may report that it no longer sees the obstacle, or the management module 15 may ascertain that the obstacle 95 is longer at the location because obstacle information wasn't received from a mobile drive unit that passed within a threshold of the location once thought to be occupied by the obstacle 95.

In other embodiments, when components of the mobile drive unit 20-9 detect the obstacle 95, the management module 15 (in this case operating as a component of the mobile drive unit 20-9) may transmit obstacle data to the mobile drive unit 20-7. In this example, the mobile drive unit 20-7 is made aware of the obstacle, potentially before it can encounter the obstacle 95 itself. Accordingly, the management module 15 of the mobile drive unit 20-7 may determine a best course of action based on the obstacle information provided by the mobile drive unit 20-9, the location of the mobile drive unit 20-7, a number of alternate paths available to the mobile drive unit 20-7, and the like.

Figure 7:
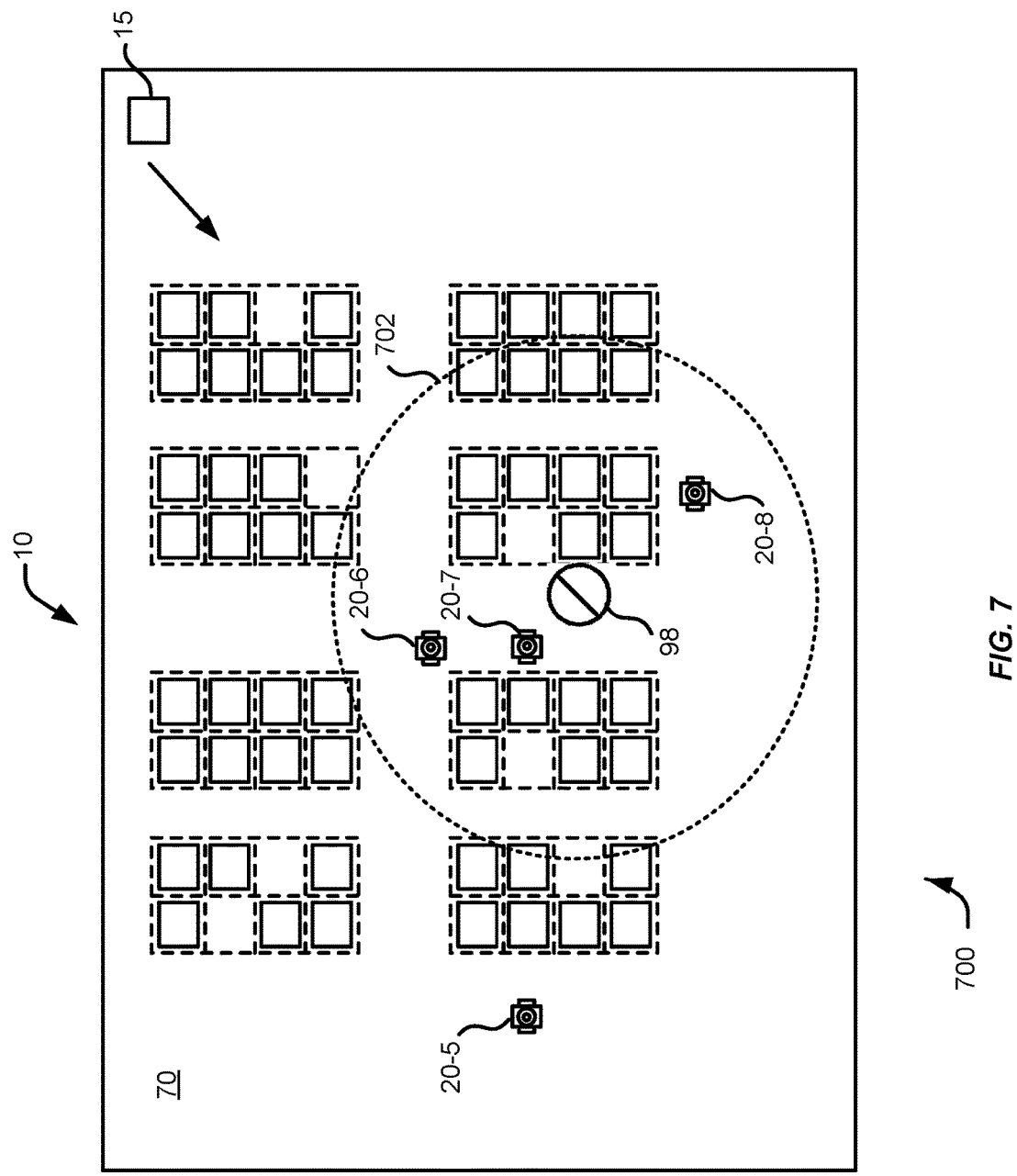
FIG. 7 illustrates yet another example environment suitable for implementing contention resolution aspects of the management module, in accordance with at least one embodiment.

FIG. 7 illustrates yet another example environment 700 suitable for implementing contention resolution aspects of the management module 15, in accordance with at least one embodiment. It should be appreciated that the example illustrated in FIG. 7 may equally apply to any suitable combination of MDUs and humans (utilizing personnel device(s)) and that the functionality provided the management module 15 may additionally, or alternatively, be provided to and/or by a personnel device. For example, the mobile drive unit 20-7 may detect an obstacle 98. In at least one embodiment, the management module 15, operating on the mobile drive unit 20-7 may broadcast and/or specifically address, a communication request to the other mobile drive units depicted in FIG. 5. The communication request, in some examples, may identify a communications channel (e.g., a frequency, a topic, etc.) which will be used to exchange information regarding the obstacle 98.

In accordance with at least one embodiment, mobile drive units located within area 702 may respond with a communication channel response that indicates that the respective mobile drive unit is interested in receiving obstacle information corresponding to the obstacle 98. Mobile drive units located outside the area 702, such as the mobile drive unit 20-5 may ignore the communication channel request entirely or, in some embodiments, the communication channel request may not be addressed to the mobile drive unit 20-5 due to the fact that the mobile drive unit 20-5 is located outside the area 702.

At a suitable time (e.g., after a period of time has elapsed since communication channel request transmission, or after a period of time has elapsed since a last communication channel response has been received by the mobile drive unit 20-7) the mobile drive unit 20-7 may transmit obstacle information corresponding to the obstacle 98 via the communications channel. This obstacle information may be received by the mobile drive unit 20-6 and the mobile drive unit 20-8 via the communications channel. In at least one embodiment, the management module 15, operating individually on the mobile drive unit 20-6 and the mobile drive unit 20-7 may utilize the obstacle information to determine a best course of action (e.g., utilizing a model generated and trained using historical data associated with the workspace 70 and/or the mobile drive units operating within the workspace 70). Accordingly, the respective management modules may determine a best course of action with respect to the mobile drive unit 20-6, the mobile drive unit 207, and the mobile drive unit 20-8 given the particular attributes of the obstacle information associated with the obstacle 98. In at least on example, the management modules of the mobile drive units located with area 702 may determine new paths for completing their respective tasks if the obstacle will inhibit performance of their currently assigned tasks. In some examples, the management modules of the mobile drive units located within the area 702 will determine that the current paths should remain unchanged when the location and/or other attributes of the obstacle 98 does not inhibit completion of their current tasks.

Figure 8:
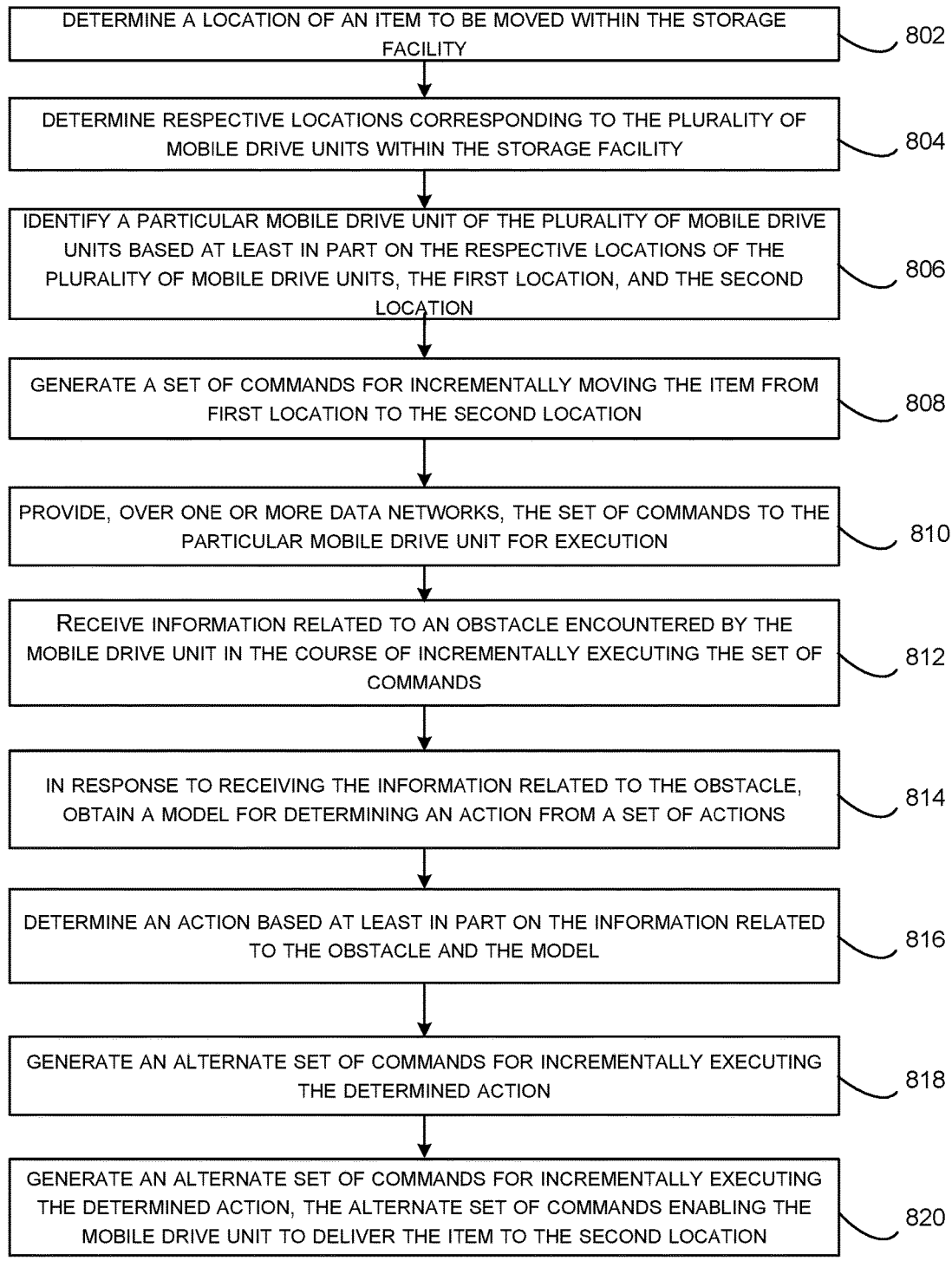
FIG. 8 is a flowchart illustrating an example method for providing contention resolution aspects of the management module, in accordance with at least one embodiment.

FIG. 8 is a flowchart illustrating an example method 800 for providing contention resolution aspects of the management module 15, in accordance with at least one embodiment. The method may be performed by a system (e.g., the inventory system 10 of FIG. 1, the system 1100 of FIG. 11, etc.) comprising a plurality of mobile drive units located within a storage facility and individually configured to move items within the storage facility, one or more data networks, one or more processors and one or more memories storing computer-readable instructions that, upon execution by the one or more processors, cause the inventory system to at least to perform the method 800. In some examples, the system may further comprise a plurality of personnel devices located within the storage facility and individually associated with a human being within the storage facility.

The method may being at block 802 where a location of an item to be moved within the storage facility is determined. In at least one example, the location of an item may be determined by an inventory module associated with the management module 15 (e.g., the inventory module 1208 of FIG. 12). In at least one example, the plurality of mobile drive units are individually configured to move the item from a first location to a second location of the storage facility.

Figure 12:
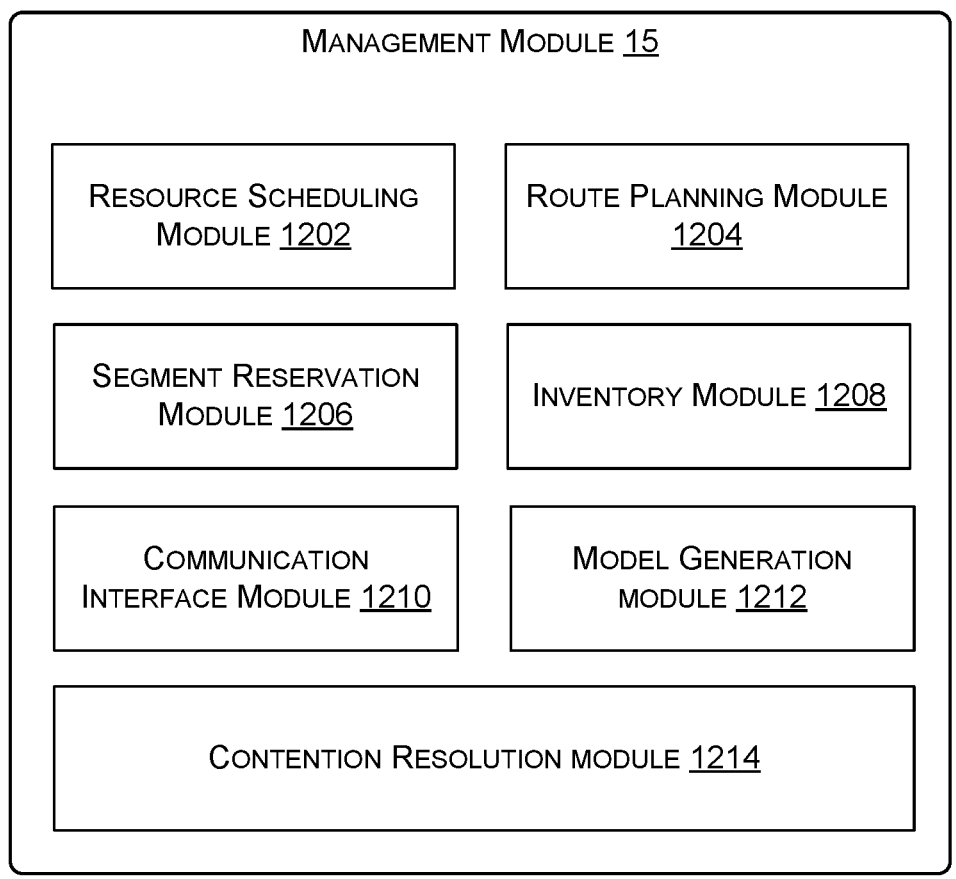
FIG. 12 illustrates in greater detail the components of an example management module that may be utilized in particular embodiments of the inventory system shown in FIG. 1.

The method may proceed to block 804, where respective locations corresponding to the plurality of mobile drive units within the storage facility are determined (e.g., by the resource scheduling module 1202 of FIG. 12 utilizing, for example, data from the position sensor 140 of FIGS. 2 and 3).

At block 806, a particular mobile drive unit of the plurality of mobile drive units is identified. In at least one embodiment, identification is based at least in part on the respective locations of the plurality of mobile drive units, the first location, and the second location. In some examples, the particular mobile drive unit is identified by a resource scheduling module of the management module 15 (e.g., the resource scheduling module 1202 of FIG. 12).

At block 808, a set of commands may be generated for incrementally moving the item from first location to the second location. In at least one embodiment, a route planning module of the management module 15 (e.g., the route planning module 1204 of FIG. 12) may generate the set of commands, where the set of commands correspond to one or more tasks to be performed by the mobile drive unit.

At block 810, the set of commands may be provided over the one or more data networks to the particular mobile drive unit for execution. In at least one example, a route planning module (e.g., the route planning module 1204 of FIG. 12) may cause the set of commands to be transmitted via communication interface module of the management module 15 (e.g., the communication interface module 1210 of FIG. 12). The communication interface module may be configured to utilized the one or more data networks for transmission.

At block 812, information related to an obstacle encountered by the mobile drive unit in the course of incrementally executing the set of commands may be received. In some examples, the information related to the obstacle (e.g., obstacle information) may be received (e.g., by a contention resolution module of the management module 15 such as the contention resolution module 1214 of FIG. 12) from the particular mobile drive unit over the one or more data networks. In some examples, the obstacle information may indicate that the obstacle inhibits the mobile drive unit from moving the item from the first location to the second location according to the set of commands.

At block 814, in response to receiving the information related to the obstacle, a model for determining an action from a set of action may be obtained (e.g., from a data store suitable to store such data). According to at least one embodiment, the model may be obtained by a contention resolution module 1214 of FIG. 12. In at least one example, the model may have been generated/trained (e.g., by the model generation module 1212 of FIG. 12) utilizing historical data associated with the plurality of mobile drive units and at least one machine learning technique. In some examples, the historical data may indicate encounters by the plurality of mobile drive units with past obstacles and one or more actions taken in response to the encounters (e.g., historical contention information and contention resolution information).

At block 816, an action of the one or more actions may be determined (e.g., by the contention resolution module 1214 of FIG. 12). The determination may be based at least in part on the information related to the obstacle, the historical data, and at least one machine learning technique. In at least one embodiment, the action of the one or more actions may correspond to a task. Further, the one or more actions may be included in the historical data.

At block 818, an alternate set of commands for incrementally executing the determined action may be generated. In some examples, the alternate set of commands may be generated by a route planning module of the management module 15 (e.g., the route planning module 1204 of FIG. 12) and may enable the mobile drive unit to deliver the item to the second location.

At block 820, the alternate set of commands for incrementally executing the determined action to the mobile drive unit may be provided over the one or more data networks. For example, a the route planning module 1204 may stimulate the communication interface module 1210 of the management module 15 to transmit the set of commands incrementally to the mobile drive unit.

Figure 9:
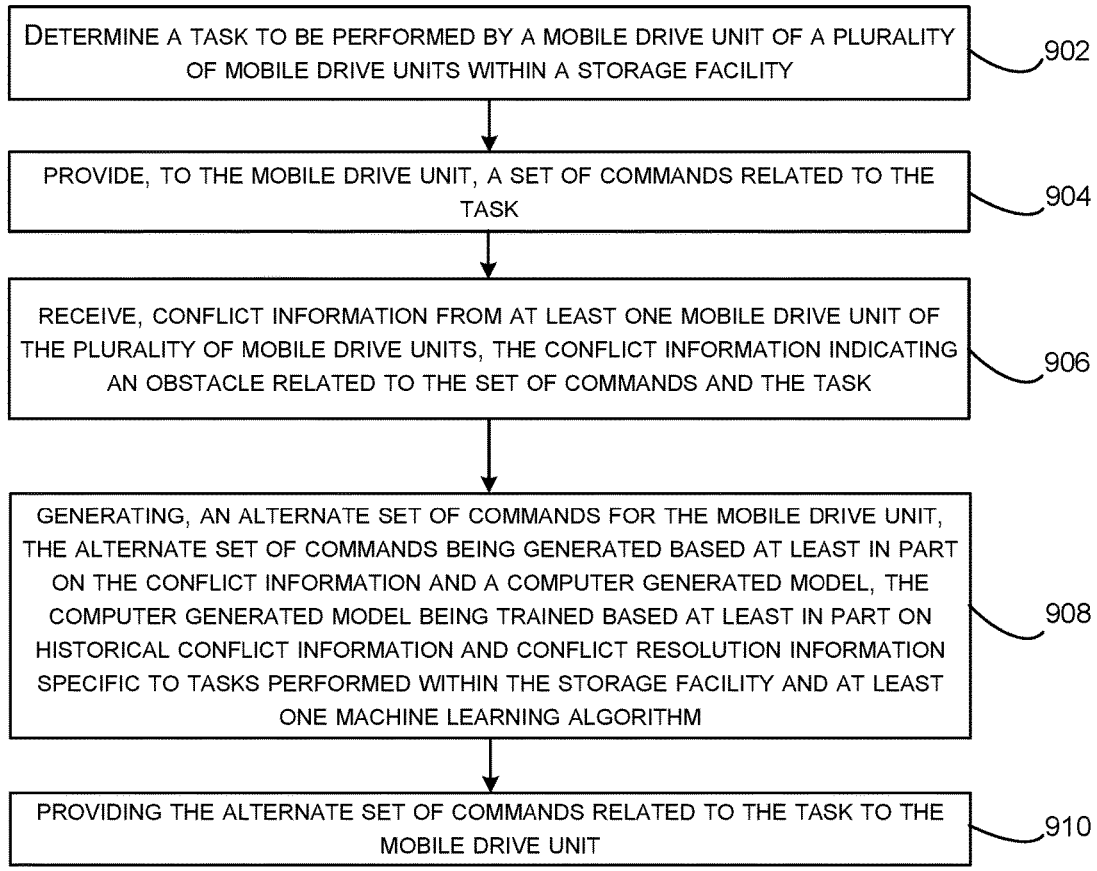
FIG. 9 is a flowchart illustrating another example method for providing contention resolution aspects of the management module, in accordance with at least one embodiment.

FIG. 9 is a flowchart illustrating another example method 900 for providing contention resolution aspects of the management module 15, in accordance with at least one embodiment. The method may begin at block 902 where a task to be performed by a mobile drive unit of a plurality of mobile drive units within a storage facility may be determined. In at least one example, the task may be determined by a resource scheduling module of the management module 15 (e.g., the route planning module 1204 of FIG. 12).

At block 904, a set of commands related to the task may be provided to the mobile drive unit. In at least one embodiment, the set of command may be provided by a route planning module of the management module 15 (e.g., the resource scheduling module 1202 of FIG. 12).

At block 906, conflict information (e.g., obstacle information) may be received from at least one mobile drive unit of the plurality of mobile drive units. In at least one embodiment, the conflict information may indicate an obstacle related to the set of commands and the task. In some embodiment, the conflict information may be received by a contention resolution module of the management module 15 (e.g., the contention resolution module 1214 of FIG. 12)

At block 908, an alternate set of commands for the mobile drive unit may be generated (e.g., by a route planning module. In some examples, the alternate set of commands may be generated based at least in part on the conflict information and a computer-generated model (e.g., by the route planning module 1204). In some embodiments the computer-generated model may be trained/generated (e.g., by the model generation module 1212 of FIG. 12) based at least in part on historical conflict information and conflict resolution information specific to tasks performed within the storage facility and at least one machine learning algorithm. In some embodiment, the model is generated/trained by a model generation module of the management module 15.

At block 910, the alternate set of commands related to the task may be provided to the mobile drive unit. In at least one embodiment, the alternate commands may be transmitted to the mobile drive over a data network by a communication interface module of the management module 15 (e.g., the communication interface module 1210 of FIG. 12).

Figure 10:
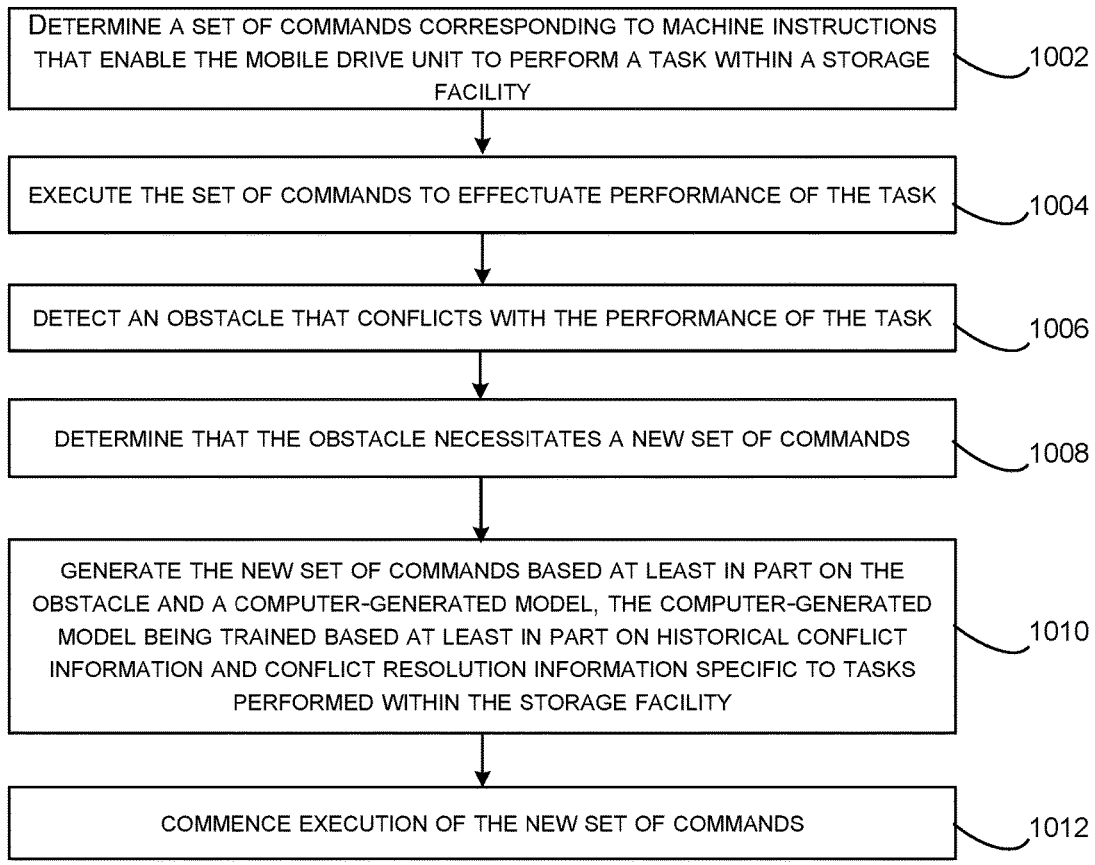
FIG. 10 is a flowchart illustrating still one further example method for providing contention resolution aspects of the management module, in accordance with at least one embodiment, in accordance with at least one embodiment.

FIG. 10 is a flowchart illustrating still one further example method 1000 for providing contention resolution aspects of the management module 15, in accordance with at least one embodiment, in accordance with at least one embodiment. The method 1000 may be performed by a management module 15 operating on a mobile drive unit (e.g., mobile drive unit 20). The method 1000, may begin at block 1002, where a set of commands may be obtained. The set of commands, in some embodiments, may correspond to machine instructions that enable the mobile drive unit to perform a task within a storage facility. In at least one embodiment, the set of commands may be determined by and/or obtained from a route planning module of the management module 15. (e.g., the route planning module 1204 of FIG. 12)

At block 1004, the set of commands may be executed (e.g., by the control module of FIGS. 2 and 3) to effectuate performance of the task.

At block 1006, an obstacle that conflicts with the performance of the task may be detected. In at least one embodiment, the obstacle sensor 160 may detect the obstacle and may communicate obstacle information to a contention resolution module of the management module 15 (e.g., the contention resolution module 1214 of FIG. 12).

At block 1008, a determination may be made that the obstacle necessitates a new set of commands. For example, the contention resolution module of the management module (e.g., the contention resolution module 1214) may determine (e.g., based on received obstacle information) that the obstacle is in the path of the mobile drive unit. Accordingly, the contention resolution module may determine that the obstacle necessitates a new set of commands.

At block 1010, the new set of commands may be obtained (e.g., from the route planning module 1204 of FIG. 12) based at least in part on the obstacle and a computer-generated model. In at least one example, the computer-generated model may have been trained (e.g., by the model generation module 1212 of FIG. 12) based at least in part on historical conflict information and conflict resolution information specific to tasks performed within the storage facility.

At block 1012, the mobile drive unit may commence execution of the set of commands (e.g., execution being performed by the control module 170 of FIGS. 2-3).

Figure 11:
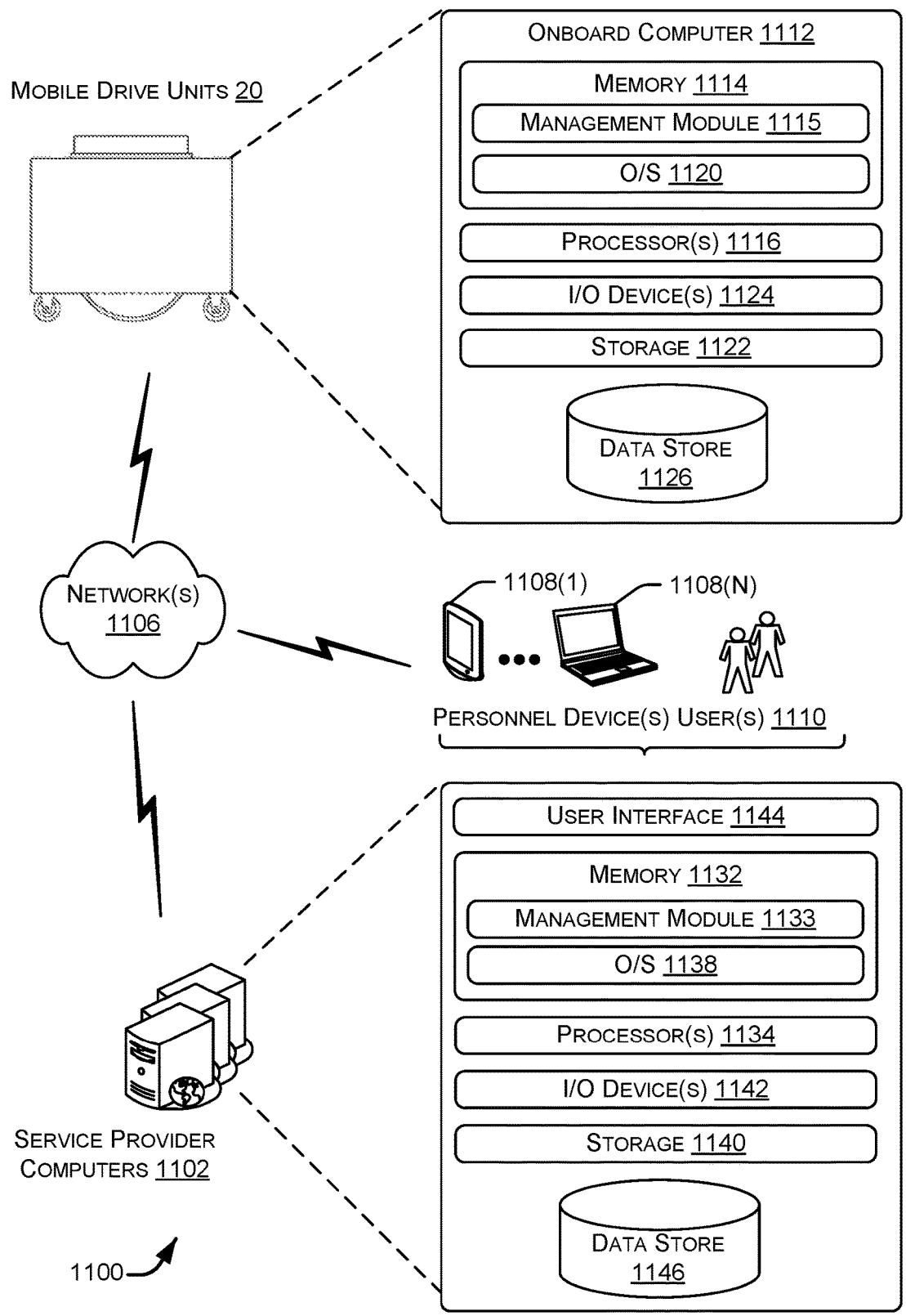
FIG. 11 is an example system architecture for implementing aspect of the inventory system, in accordance with at least one embodiment.

FIG. 11 is an example system architecture 1100 for implementing aspect of the inventory system 10 of FIG. 1, in accordance with at least one embodiment. The architecture 1100 may include a service provider computers 1102. The service provider computers 1102 may support an electronic marketplace (not shown) and interface with purchase and delivery services of the electronic marketplace. In this manner, the service provider computers 1102 may coordinate receiving, storing, packaging, and shipping of items in a warehouse operated by, or on behalf of, the electronic marketplace provider. In some examples, the service provider computers may be a stand-alone service operated on its own or in connection with an electronic marketplace. In either example, the service provider computers 1102 may be in communication with the mobile drive units 20 of FIG. 1 via one or more network(s) 1106 (hereinafter, "the network 1106"). The network 1106 may include any one or a combination of many different types of networks, such as cable networks, the Internet, wireless networks, cellular networks, radio networks, and other private and/or public networks.

Personnel devices 1108(1)-1108(N) (hereinafter, "the personnel device 1108") may also be in communication with the service provider computers 1102 via the network 1106. The user device 1108 may be operable by one or more users 1110 (hereinafter, "the users 1110") to access the service provider computers 1102 via the network 1106. The personnel device 1108 may be any suitable device capable of communicating with the network 1106. For example, the personnel device 1108 may be any suitable computing device such as, but not limited to, a mobile phone, a smart phone, a personal digital assistant (PDA), a laptop computer, a thin-client device, a tablet PC, a desktop computer, a set-top box, or other computing device. The personnel device 1108 may include similar components provided in the onboard computer 1112, including one or more processors, memory, I/O devices, one or more data stores, additional storage, an operating system, and, in particular embodiments, a management module similar to the management module 1115. The functionality provided by the management module 1115 discussed below with respect to the mobile drive units 20 may similar be provided by a management module operating on a personnel device 1108. Likewise, the functionality of management module 1133 provided to the mobile drive units 20 may similarly be provided to the personnel device 1108.

Turning now to the details of the mobile drive units 20, the mobile drive units 20 may include (in addition to the components discussed in connection with FIGS. 2 and 3) an onboard computer 1112 including at least one memory 1114 and one or more processing units (or processor(s)) 916. The processor(s) 1116 may be implemented as appropriate in hardware, computer-executable instructions, software, firmware, or combinations thereof. Computer-executable instruction, software or firmware implementations of the processor(s) 1116 may include computer-executable or machine-executable instructions written in any suitable programming language to perform the various functions described. The memory 1114 may include more than one memory and may be distributed throughout the onboard computer. The memory 1114 may store program instructions (e.g. the management module 1115, and example of the management module 15 of FIG. 1) that are loadable and executable on the processor(s) 1116, as well as data generated during the execution of these programs. Depending on the configuration and type of memory including the management module 1115, the memory 1114 may be volatile (such as random access memory (RAM)) and/or non-volatile (such as read-only memory (ROM), flash memory, or other memory). The memory 1114 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 1114 may include multiple different types of memory, such as static random access memory (SRAM), dynamic random access memory (DRAM), or ROM. Turning to the contents of the memory 1114 in more detail, the memory 1114 may include an operating system 1120 and one or more application programs, modules or services for implementing the features disclosed herein including at least the management module 1115.

In some examples, the onboard computer may also include additional storage 1122, which may include removable storage and/or non-removable storage. The additional storage 1122 may include, but is not limited to, magnetic storage, optical disks, and/or tape storage. The disk drives and their associated computer-readable media may provide non-volatile storage of computer-readable instructions, data structures, program modules, and other data for the computing devices.

The memory 1114 and the additional storage 1122, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 1112. The modules of the onboard computer 1112 may include one or more components. The onboard computer 1112 may also include input/output (I/O) device(s) 924 and/or ports, such as for enabling connection with a keyboard, a mouse, a pen, a voice input device, a touch input device, a display, speakers, a printer, or other I/O device. The I/O device(s) 924 may enable communication with the other systems of the mobile drive units 20 (e.g., the components discussed in connection with FIGS. 2 and 3.

The onboard computer 1112 may also include data store 1126. The data store 1126 may include one or more databases, data structures, or the like for storing and/or retaining information associated with the mobile drive units 20 (e.g., historical contention information, contention resolution information, device information, etc.).

Turning now to the details of the user device 1108. The user device 1108 may be used by the user(s) 1110 for interacting with the service provider computers 1102. The user device 1108 may therefore include a memory, a processor, a user-interface, a web-service application, and any other suitable feature to enable communication with the features of architecture 1100. The web service application may be in the form of a web browser, an application programming interface (API), virtual computing instance, or other suitable application. In some examples, when the service provider computers 1102 are part of, or share an association with, an electronic marketplace, the user device 1108 may be used by the user(s) 1110 for procuring one or more items from the electronic marketplace.

The service provider computers 1102, perhaps arranged in a cluster of servers or as a server farm, may host web service applications. These servers may be configured to host a website (or combination of websites) viewable via the user device 1108. In at least one example, the service provider computers 1102 may be configured to manage the mobile drive units 20 as part of an inventory system (e.g., the inventory system 10). The service provider computers 1102 may include at least one memory 1132 and one or more processing units (or processor(s)) 1134. The processor(s) 1134 may be implemented as appropriate in hardware, computer-executable instructions, software, firmware, or combinations thereof. Computer-executable instruction, software or firmware implementations of the processor(s) 1134 may include computer-executable or machine-executable instructions written in any suitable programming language to perform the various functions described.

The memory 1132 may include more than one memory and may be distributed throughout the service provider computers 1102. The memory 1132 may store program instructions (e.g., management module 1136) that are loadable and executable on the processor(s) 1134, as well as data generated during the execution of these programs. Depending on the configuration and type of memory including the management module 1136, the memory 1132 may be volatile (such as random access memory (RAM)) and/or non-volatile (such as read-only memory (ROM), flash memory, or other memory). The service provider computers 1102 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1132 may include multiple different types of memory, such as static random access memory (SRAM), dynamic random access memory (DRAM), or ROM.

Turning to the contents of the memory 1132 in more detail, the memory 1132 may include an operating system 1138 and one or more application programs, modules or services for implementing the features disclosed herein including at least the management module 1136. The management module 1136, in some examples, may function similarly to the management module 1115 with respect to determining tasks for the mobile drive units 20, determining a set of action to perform to execute the task, determining a best course of action when the mobile drive units 20 encounter a contention/obstacle. For example, when the mobile drive units 20 are in network communication with the service provider computers 1102, the mobile drive units 20 may receive at least some instructions from the service provider computers 1102 as the management module 1136 is executed by the processors 1134. In some examples, the mobile drive unit 20 executes the management module 1115 (e.g., that implement the features described with respect to obstacle reporting and peer-to-peer communication features) to operate independent of the service provider computers 1102.

In some examples, the service provider computers 1102 may also include additional storage 1140, which may include removable storage and/or non-removable storage. The additional storage 1140 may include, but is not limited to, magnetic storage, optical disks, and/or tape storage. The disk drives and their associated computer-readable media may provide non-volatile storage of computer-readable instructions, data structures, program modules, and other data for the computing devices.

The memory 1132 and the additional storage 1140, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 1102. The modules of the service provider computers 1102 may include one or more components. The service provider computers 1102 may also include input/output (I/O) device(s) 1142 and/or ports, such as for enabling connection with a keyboard, a mouse, a pen, a voice input device, a touch input device, a display, speakers, a printer, or other I/O device.

In some examples, the service provider computers 1102 may include a user interface 1144. The user interface 1144 may be utilized by an operator, or other authorized user to access portions of the service provider computers 1102. In some examples, the user interface 1144 may include a graphical user interface, web-based applications, programmatic interfaces such as application programming interfaces (APIs), or other user interface configurations. The service provider computers 1102 may also include data store 1146. The data store 1146 may include one or more databases, data structures, or the like for storing and/or retaining information associated with the service provider computers 1102. In some examples, the service provider computers 1102 may store a larger amount of information in the data store 1146 than the onboard computer 1112 is capable of storing in the data store 1126. Thus, in some examples, at least a portion of the information from the databases in the data store 1146 is copied to the databases of the data store 1126, e.g., periodically, occasionally, in connection with an event, or otherwise. In this manner, the data store 1126 may have up-to-date information, without having to maintain the databases.

In at least one embodiment, the management module 1115 and/or the server management module 1133 (hereinafter, the "management modules") may provide the functionality of the management module 15 of FIG. 1 from a mobile drive unit centric or server centric viewpoint, respectively.

FIG. 12 illustrates in greater detail the components of a particular embodiment of a management module (e.g., the management module 15 of FIG. 1). As shown, the example embodiment includes a resource scheduling module 1202, a route planning module 1204, a segment reservation module 1206, an inventory module 1208, a communication interface module 1210, a contention resolution module 1214, and a model generation module 1212. As discussed above, the management module 15 may represent a single component, multiple components located at a central location within inventory system 10, or multiple components distributed throughout inventory system 10. For example, management module 15 may represent components of one or more mobile drive units 20 (e.g., the components discussed in connection with FIGS. 2 and 3) that are capable of communicating information between the mobile drive units 20 and coordinating the movement of the mobile drive units 20 within the workspace 70. In general, the management module 15 may include any appropriate combination of hardware and/or software suitable to provide the described functionality.

In at least one embodiment, the resource scheduling module 1202 may be configured to process received inventory requests and generate one or more assigned tasks to be completed by the components of the inventory system 10. The resource scheduling module 1202 may also select one or more appropriate components for completing the assigned tasks and may communicate, via the communication interface module 1210, the assigned tasks to the relevant components. In some examples, the resource scheduling module 1202 may select the one or more appropriate components (e.g., MDUs) based on a location of the MDU (e.g., as determined by the position sensor 140 of FIGS. 2 and 3). Additionally, the resource scheduling module 1202 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing the mobile drive units 20 selected for repair or maintenance to move towards a designated maintenance station. Additionally, the resource scheduling module 1202 may also be responsible for assigning tasks and/or updating previously-assigned tasks in response to contention resolution processing associated with one or more contention/obstacle encountered by one or more mobile drive units (e.g., the mobile drive units 20).

In at least one embodiment, the route planning module 1204 may receive route requests from the mobile drive units 20. These route requests may identify one or more destinations associated with a task the requesting mobile drive unit 20 is executing. In response to receiving a route request, the route planning module 1204 may generate a path to one or more destinations identified in the route request. The route planning module 1204 may implement any appropriate algorithms utilizing any appropriate parameters, factors, and/or considerations to determine the appropriate path. After generating an appropriate path, the route planning module 1204 may transmit a route response identifying the generated path to the requesting the mobile drive unit 20 using the communication interface module 1210.

In at least one embodiment, the segment reservation module 1206 may receive reservation requests from the mobile drive units 20 attempting to move along paths generated by the route planning module 1204. These reservation requests may indicate a request for the use of a particular portion of the workspace 70 (referred to herein as a "segment") to allow the requesting mobile drive unit 20 to avoid collisions with other mobile drive units 20 while moving across the reserved segment. In response to received reservation requests, segment reservation module 1206 may transmit a reservation response granting or denying the reservation request to the requesting mobile drive unit 20 using the communication interface module 1210. In at least one embodiment, the segment reservation module 1206 may be configured to detect a contention (e.g., to mobile drive units attempting to reserve the same area of the workspace 70 of FIG. 1). In at least one example, the segment reservation module 1206 may be configured to stimulate the contention resolution module 1214 (e.g., by sending obstacle information corresponding to the contention) to determine a best course of action (e.g., one or more tasks) to resolve the contention.

In at least one embodiment, the inventory module 1208 may maintain information about the location and number of inventory items in the inventory system 10. Information can be maintained about the number of inventory items in a particular inventory holder 30, and the maintained information can include the location of those inventory items in the inventory holder 30. The inventory module 1208 can also communicate with the mobile drive units 20, utilizing task assignments 18 of FIG. 1 to maintain, replenish or move inventory items within the inventory system 10.

In at least one embodiment, the communication interface module 1210 may facilitate communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 1210 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 1210 may facilitate communication between management module 15 and other parts of the same system component.

In at least one embodiment, the communication interface module 1210 may be configured to transmit and/or receive communication channel requests/responses. For example, in a scenario in which the management module 15 is a component of a mobile drive unit 20 (or a component of a personnel device) operating in a peer-to-peer architecture, the communication interface module 1210 may be configured to transmit a communication channel request to a broadcast and/or specific address. The communication channel request may include an indication of a specific channel, topic, frequency or the like that may be utilized to exchange obstacle information and contention resolution information.

A communication channel response may include an indication that one or more mobile drive units are listening to the communication channel indicated in the response. The communication interface module 1210 may be configured to transmit obstacle information via the communication channel and receive contention resolution information from other mobile drive units and/or other personnel devices via the communication channel. The communication interface module 1210 may communicate the received contention resolution information to the contention resolution module 1214 in order to cause the contention resolution module 1214 to determine if the action(s) to be taken by the other mobile drive units 20 will produce a future contention/obstacle.

In at least one embodiment, the model generation module 1212 may be configured to receive historical data including historical contention information and/or contention resolution information (e.g., from the mobile drive units 20, from the personnel device 1108, from a predetermined storage location, etc.). It should be appreciated that, in particular embodiments, historical contention information and/or contention resolution information may be pre-generated utilizing a simulated model. For example, a simulated model may be generated to produce random contentions/obstacles and/or contentions/obstacles based on past events. The simulated model may further be utilized to generate one or more simulated paths corresponding to potential conflict resolutions. Historical contention information and/or contention resolution information generated utilizing a simulated model may be utilized in the same manner as that of such information that was collected based on actual actions performed by components of the inventory system (e.g., MDUs, personnel devices).

In at least one embodiment, the model generation module 1212 may utilize one or more machine learning techniques, the historical contention information (e.g., obstacle information including sensor data generated by one or more sensors of the MDU and/or the personnel device 1108) and/or contention resolution information (e.g., a set of commands/tasks corresponding to paths traversed by an MDU/human after encountering the obstacle, an expected task completion time, an actual task completion time, a time delay value quantifying a difference between an expected task completion time and an actual task completion time, or the like) to generate and/or train a statistical model. The generated model may take as input obstacle information such as identifiers of the one or more MDUs (and/or one or more personnel devices) involved in a contention, a task and/or a priority associated with the task assigned to the one or more MDUs/humans, sensor data related to an obstacle, a location of the obstacle, a location of the MDU/personnel device providing the information, one or more locations associated with other MDUs/human within a threshold distance of the location of the obstacle and/or the MDU/personnel device, a number of alternate paths available to the MDU/human, or the like. The statistical model generated by the model generation module 1212 may provide as output identification of a best course of action to take given the given inputs. In some examples, the model may output an identifier that may be used to look up a stored protocol set corresponding to a set of actions that constitute the identified best course of action. The protocol set may be stored in any suitable storage location discussed herein, or as a separate data store. In at least one example, a priority associated with a task to be performed by an mobile drive unit may affect the best course of action determined by the model. For example, as the model is being trained, tasks associated with a higher priority may be weighed more heavily than tasks having a lower priority. For example, a delay of 10 seconds for a lower priority task may not have a significant effect on whether or not the model determines that the set of actions that caused the 10 second delay are, in fact, the best course of action. However, a 10 second delay for a high priority task may have a significant effect on whether or not the model will indicate that set of actions as the best course of action.

In at least one embodiment, the contention resolution module 1214 may be configured to receive obstacle information from mobile drive units (or from a component of the mobile drive units 20 such as the obstacle sensor 160) and/or from personnel devices (or from a component of the personnel device 1108, and/or from any suitable obstacle sensing device (e.g., a camera, an infra-red sensor, or the like, that is located within the storage facility) indicating a contention/obstacle has been encountered. In at least one example, the segment reservation module 1206 may communicate information to the contention resolution module 1214 indicating a contention (e.g., two requests received to reserve the same area of the workspace 70). The contention resolution module 1214 may be configured to utilize a model generated by the model generation module 1212 and/or a stored protocol set identified by the model in order to determine a best course of action. Upon determining the best course of action utilizing the model and/or protocol set, the contention resolution module 1214 may be configured to stimulate the resource scheduling module 1202 to assign a mobile drive unit one or more tasks. The contention resolution module 1214 may further be configured to stimulate the route planning module 1204 to generate a new path for the mobile drive unit given the determined best course of action.

In some examples, upon receiving indication of a contention/obstacle, the contention resolution module 1214 may make a choice as to whether to use the model to determine a best course of action, or whether to attempt a new approach (e.g., a set of actions never attempted before). The contention resolution module 1214, in such cases, may determine a priority for the task associated with the mobile drive unit (e.g., from the received obstacle information). If the priority is less than a threshold value, the contention resolution module 1214 may determine that a new approach should be used and may stimulate the resource scheduling module 1202 and the route planning module 1204 to generate new tasks/routes (which may be compared to stored protocol sets in order to assure uniqueness). In at least one embodiment, the priority may indicate that the task is high priority (e.g., over a threshold value). In such cases, the contention resolution module 1214 may determine that the model should be utilized to determine a best course of action rather than attempting a new approach.

In accordance with at least one embodiment, the contention resolution module 1214 may be configured to receive a path that has been generated by the route planning module 1204. The contention resolution module 1214 may compare the path to other paths of other mobile drive units and/or humans (via corresponding personnel devices) in the inventory system to ascertain whether the path of one or more MDUs and/or humans may conflict. If so, the contention resolution module 1214 may be configured to cause the route planning module 1204 to regenerate paths for which a conflict may arise. The process may be repeated any suitable number of times until the route planning module has generated paths for the mobile drive units and/or humans that do not conflict (e.g., will not present a contention/obstacle within some threshold confidence level).

In general, the resource scheduling module 1202, the route planning module 1204, the segment reservation module 1206, the inventory module 1208, the communication interface module 1210, the model generation module 1212, and the contention resolution module 1214 may each represent any appropriate hardware and/or software suitable to provide the described functionality. In addition, as noted above, management module 15 may, in particular embodiments, represent multiple different discrete components and any or all of the resource scheduling module 1202, the route planning module 1204, the segment reservation module 1206, the inventory module 1208, the communication interface module 1210, and the contention resolution module 1214 may represent components physically separate from the remaining elements of management module 15. Moreover, any two or more of the resource scheduling module 1202, the route planning module 1204, the segment reservation module 1206, the inventory module 1208, the communication interface module 1210, and the contention resolution module 1214 may share common components.

Figure 13:
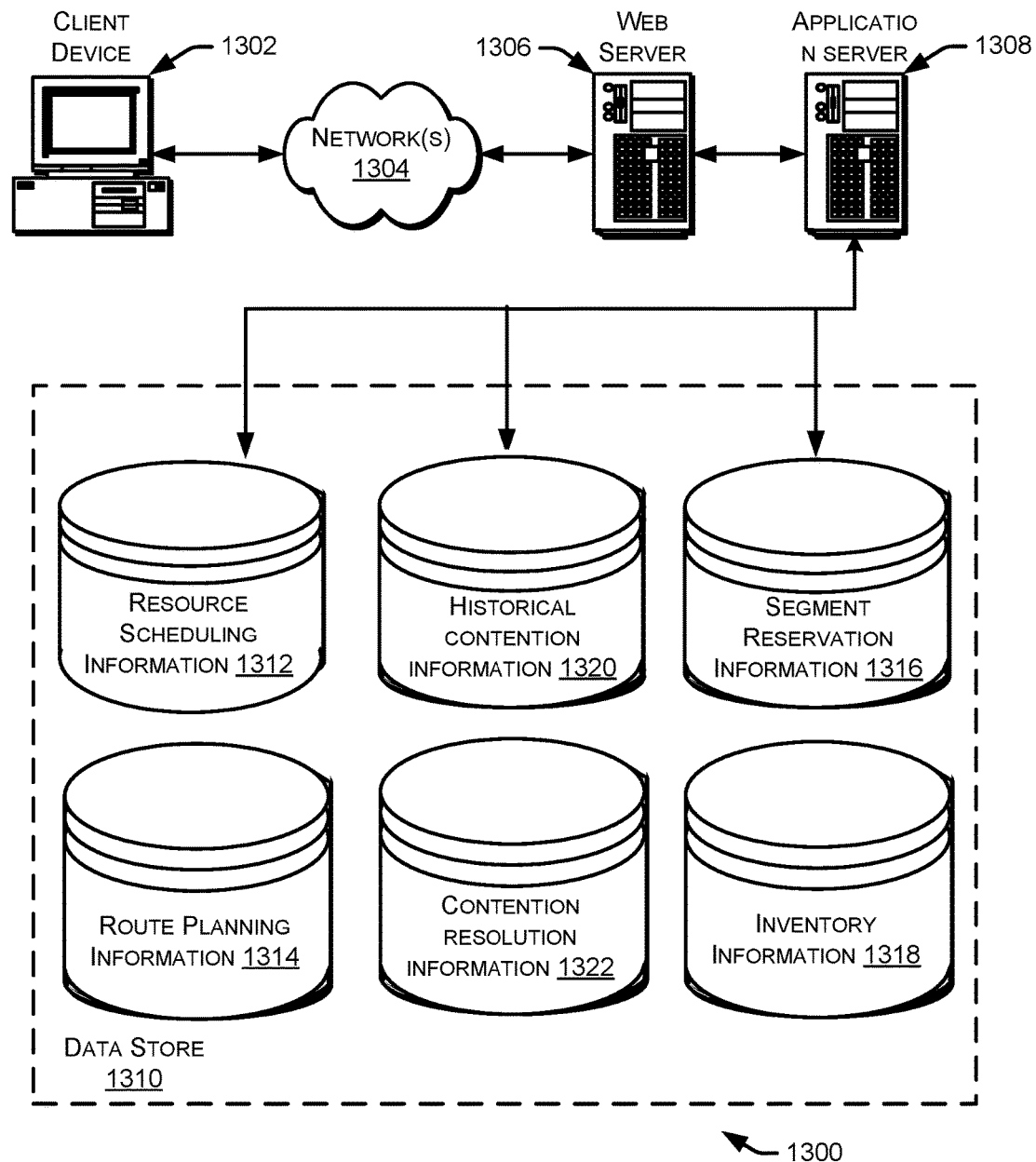
FIG. 13 is a schematic diagram illustrating an example environment for implementing aspects in accordance with at least one embodiment described herein.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing information which can be used by modules described herein, such as resource scheduling information 1312, route planning information 1314, segment reservation information 1316, inventory information 1318, historical contention information 1320, and/or contention resolution information 1322. It should be understood that there can be many other aspects that may need to be stored in the data store 1310. The data store 1310 is operable, through logic associated therewith, to receive instructions from the application server 1308 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
a plurality of mobile drive units located within a storage facility and individually configured to move items within the storage facility;
one or more data networks;
one or more processors; and
one or more memories storing computer-readable instructions that, upon execution by the one or more processors, cause the inventory system to at least:
determine a location of an item to be moved within the storage facility from a first location to a second location;
identify a mobile drive unit of the plurality of mobile drive units based at least in part on respective locations of the plurality of mobile drive units, the first location, and the second location;
generate a set of commands for incrementally moving the item from first location to the second location;
provide, over the one or more data networks, the set of commands to the mobile drive unit, wherein providing the set of commands to the mobile drive unit causes the mobile drive unit to execute at least one of the set of commands;
receive, from the mobile drive unit over the one or more data networks, information related to an obstacle encountered by the mobile drive unit in the course of incrementally executing the set of commands, the obstacle inhibiting the mobile drive unit from moving the item from the first location to the second location according to the set of commands;
in response to receiving the information related to the obstacle, obtain a model for determining an action from a set of actions, the model having been generated utilizing historical data associated with the plurality of mobile drive units and at least one machine learning technique, the historical data indicating encounters by the plurality of mobile drive units with past obstacles and one or more actions taken in response to the encounters;
determine an action of the one or more actions based at least in part on the information related to the obstacle and the model;
generate an alternate set of commands for incrementally executing the determined action;
provide, over the one or more data networks, the alternate set of commands for incrementally executing the determined action to the mobile drive unit, wherein providing the alternate set of commands to the mobile drive unit causes the mobile drive unit to execute at least one of the alternate set of commands;
obtain conflict resolution information based at least in part on monitoring the plurality of mobile drive units for a period of time after providing the alternate set of commands, wherein the conflict resolution information comprises a time measurement corresponding to task performance by at least one mobile drive unit of the plurality of mobile drive units; and
modify the model based at least in part on the conflict resolution information.

2. The inventory system of claim 1, wherein the obstacle comprises at least one of another mobile drive unit, a stationary object, or a malfunction of the mobile drive unit.

3. The inventory system of claim 1, wherein execution of the computer-readable instructions further causes the inventory system to:
reserve, to the mobile drive unit, a first path within the storage facility for moving the item from the first location to the second location, the first path associated with the set of commands;
in response to generating the alternate set of commands, enable the first path to be reserved by another mobile drive unit of the plurality of mobile drive units; and
reserve, to the mobile drive unit, a second path within the storage facility for moving the item from a location associated with the obstacle to the second location, the second path associated with the alternate set of commands.

4. The inventory system of claim 1, wherein the information related to the obstacle is collected by one or more sensors of the mobile drive unit.

5. A computer-implemented method, comprising:
determining a task to be performed by a mobile drive unit of a plurality of mobile drive units within a storage facility;
providing, to the mobile drive unit, a set of commands related to the task, wherein providing the set of commands causes the mobile drive unit to execute at least one of the set of commands;
receiving conflict information from at least one mobile drive unit of the plurality of mobile drive units, the conflict information indicating an obstacle related to the set of commands and the task;
generating an alternate set of commands for the mobile drive unit, the alternate set of commands being generated based at least in part on the conflict information and a computer-generated model, the computer-generated model being trained based at least in part on historical conflict information specific to tasks performed within the storage facility and at least one machine learning algorithm;
providing the alternate set of commands related to the task to the mobile drive unit, wherein providing the alternate set of commands causes the mobile drive unit to execute at least one of the alternate set of commands;

obtaining new conflict resolution information based at least in part on monitoring the plurality of mobile drive units for a period of time after the mobile drive unit has commenced executing the at least one of the alternate set of commands, wherein the new conflict resolution information comprises a time measurement corresponding to task performance by at least one mobile drive unit of the plurality of mobile drive units; and modifying the computer-generated model based at least in part on the new conflict resolution information.

6. The computer-implemented method of claim 5, wherein the conflict information is received from a different mobile drive unit than the mobile drive unit performing the task.

7. The computer-implemented method of claim 5, further comprising:

determining a first priority for the task;

in response to receiving the conflict information, identifying a second mobile drive unit related to the conflict information; and determining a second priority for a second task assigned to the second mobile drive unit, wherein the alternate set of commands are generated based at least in part on the first priority and the second priority.

8. The computer-implemented method of claim 5, wherein the conflict information comprises at least two of a location of the obstacle, an identifier of the mobile drive unit, one or more locations of one or more mobile drive units of the plurality of mobile drive units within a threshold distance of the location of the obstacle, a number of parallel paths available to the mobile drive unit, an indication of an obstacle type associated with the obstacle, or a malfunction identifier of the mobile drive unit.

9. The computer-implemented method of claim 5, wherein the new conflict resolution information further comprises navigational information corresponding to the plurality of mobile drive units over a period of time.

10. The computer-implemented method of claim 5, further comprising:

determining a conflict resolution score for an action associated with the alternate set of commands, the conflict resolution score being determined utilizing the computer-generated model, wherein the computer-generated model scores the action based at least in part on the at least one time measurement associated with the new conflict resolution information, wherein future actions are determined based at least in part on the new conflict resolution information and the conflict resolution score.

11. The computer-implemented method of claim 5, wherein at least one of the historical conflict information or the conflict resolution information is pre-generated utilizing a simulated model.

12. The computer-implemented method of claim 5, further comprising:

providing subsequent commands to at least one of the plurality of mobile drive units based at least in part on the modified model, wherein providing the subsequent commands to the at least one mobile drive unit causes the at least one mobile drive unit to execute at least one of the subsequent commands.

13. One or more computer-readable storage media comprising computer-readable instructions that, upon execution by one or more processors of a mobile drive unit, cause the mobile drive unit to perform operations comprising:

obtaining a set of commands corresponding to machine instructions that enable the mobile drive unit to perform a task within a storage facility;

executing the set of commands to effectuate performance of the task;

detecting an obstacle that conflicts with the performance of the task;

determining that the obstacle necessitates a new set of commands;

obtaining the new set of commands based at least in part on the obstacle and a computer-generated model, the computer-generated model being trained based at least in part on historical conflict information and conflict resolution information specific to tasks performed within the storage facility;

commencing execution of the new set of commands; and providing conflict resolution information for a period of time after commencing the execution of the new set of commands, the conflict resolution information comprising a time measurement corresponding to task performance by the mobile drive unit, wherein providing the conflict resolution information causes the computer-generated model to be retrained based at least in part on the conflict resolution information.

14. The computer-readable medium of claim 13, wherein the operations further comprise:

determining a communication channel with which to communicate obstacle information;

broadcasting a communication request on the communication channel;

receiving a communication response from at least one other mobile drive unit within the storage facility; and broadcasting, on the communication channel, the obstacle information.

15. The computer-readable medium of claim 14, wherein the communication request comprises a location of the obstacle, and wherein the communication response is received from at least one mobile drive unit that is located within a threshold distance of the obstacle.

16. The computer-readable medium of claim 13, wherein the operations further comprise:

tracking navigational information and sensor data associated with the mobile drive unit;

receiving a request for the navigation information and sensor data, the request being received from a remote system; and transmitting the navigation information and sensor data to the remote system, wherein the new set of commands is further based at least in part on the navigational information and sensor data, and wherein the navigation information and sensor data are utilized by the remote system to generate one or more protocol sets for obstacle resolution.

17. The computer-readable medium of claim 13, wherein the operations further comprise:

obtaining a plurality of protocol sets, an individual protocol set being related to obstacle resolution, wherein the plurality of protocol sets are determined by a remote system based at least in part on historical information related to a plurality of mobile drive units operating in the storage facility and the at least one machine learning algorithm; and determining a particular protocol set from the plurality of protocol sets based at least in part on the obstacle, wherein the new set of commands are generated according to the protocol set.

18. The computer-readable medium of claim 13, wherein the operations further comprise:
    determining a priority associated with the task, wherein the new set of commands are generated according to the historical information associated with a plurality of mobile drive units when the priority is above a threshold amount, and wherein the new set of commands is calculated such that the set is unique with respect to the historical information when the priority is below a threshold amount.

19. The computer-readable medium of claim 13, wherein the set of commands and the new set of commands are based at least in part on other sets of commands associated with a plurality of mobile drive units within the storage facility.

* * * * *